US012776727B2

(12) United States Patent
Kataoka

(10) Patent No.: US 12,776,727 B2
(45) Date of Patent: Oct. 27, 2026

(54) POWER CONVERSION DEVICE

(71) Applicant: NIDEC CORPORATION, Kyoto (JP)

(72) Inventor: Kotaro Kataoka, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 190 days.

(21) Appl. No.: 18/851,694

(22) PCT Filed: Mar. 29, 2023

(86) PCT No.: PCT/JP2023/013015
§ 371 (c)(1),
(2) Date: Sep. 27, 2024

(87) PCT Pub. No.: WO2023/190787
PCT Pub. Date: Oct. 5, 2023

(65) Prior Publication Data

US 2025/0211135 A1 Jun. 26, 2025

(30) Foreign Application Priority Data

Mar. 31, 2022 (JP) ................................ 2022-060077

(51) Int. Cl.
*H02M 7/5395* (2006.01)
*H02M 1/00* (2007.01)
(Continued)

(52) U.S. Cl.
CPC ....... *H02M 7/5395* (2013.01); *H02M 1/0009* (2021.05); *H02M 1/14* (2013.01); *H02M 7/53871* (2013.01)

(58) Field of Classification Search
CPC . H02M 1/0009; H02M 7/5387; H02M 7/5395
See application file for complete search history.

(56) References Cited

U.S. PATENT DOCUMENTS 10,742,137 B2 * 8/2020 Ohashi .................... H02P 27/06
10,778,084 B2 * 9/2020 Wada .................. B62D 5/0463
(Continued)

FOREIGN PATENT DOCUMENTS

JP 2017077061 A 4/2017
JP 2017093077 A 5/2017
(Continued)

OTHER PUBLICATIONS

International Search Report in PCT/JP2023/013015, mailed Jun. 13, 2023. 4pp.

*Primary Examiner* — Gary A Nash
(74) *Attorney, Agent, or Firm* — HAUPTMAN HAM, LLP

(57) ABSTRACT

A power conversion device includes a first three-phase full-bridge circuit connected to one end of a three-phase coil of an open-winding three-phase motor, a second three-phase full-bridge circuit connected to another end of the three-phase coil, and a control unit that individually controls voltage application time of the three-phase coil. The control unit minimizes a width of a first time region in which voltage application time of an X-phase coil and voltage application time of a Y-phase coil overlap within one control period of the pulse width modulation, and changes a position of a second time region occupied by voltage application time of the Z-phase coil within the one control period, based on target voltage application time length of each of the X-phase coil, the Y-phase coil, and the Z-phase coil with a smallest current value among the three-phase coils and a current direction of the Z-phase coil.

15 Claims, 26 Drawing Sheets

(51) Int. Cl.
*H02M 1/14* (2006.01)
*H02M 7/5387* (2007.01)

(56) References Cited

U.S. PATENT DOCUMENTS

| | | | | |
|---|---|---|---|---|
| 10,826,424 | B2 * | 11/2020 | Welchko ............. | H02M 7/5395 |
| 11,095,233 | B2 * | 8/2021 | Nabeshi .................. | H02P 27/06 |
| 11,114,969 | B2 * | 9/2021 | Ohashi ................. | H02H 7/0838 |
| 11,414,124 | B2 * | 8/2022 | Nabeshi ................. | B62D 5/046 |
| 11,420,672 | B2 * | 8/2022 | Ohashi ................... | B62D 5/046 |
| 11,979,104 | B2 | 5/2024 | Saha et al. | |
| 2020/0021226 | A1 | 1/2020 | Welchko et al. | |
| 2021/0257947 | A1 * | 8/2021 | Kinjo .................... | H02M 7/493 |

FOREIGN PATENT DOCUMENTS

| | | | |
|---|---|---|---|
| JP | 2020137263 | A | 8/2020 |
| WO | 2019244418 | A1 | 12/2019 |

* cited by examiner

POWER CONVERSION DEVICE

CROSS-REFERENCE TO RELATED APPLICATIONS

This is the U.S. national stage of application No. PCT/JP2023/013015, filed on Mar. 29, 2023, and priority under 35 U.S.C. § 119 (a) and 35 U.S.C. § 365 (b) is claimed from Japanese Patent Application No. 2022-060077, filed on Mar. 31, 2022.

FIELD OF THE INVENTION

The present invention relates to a power conversion device.

BACKGROUND

Conventionally, a three-phase motor drive device including a dual inverter is known. In the conventional technique, in each of the three H-bridges of the dual inverter, a fixed potential leg and a pulse width modulation (PWM) leg are alternately switched every electrical angle of 180 degrees of a three-phase motor. Further, in one PWM cycle period, a current supply periods of three H-bridges are arranged so as not to overlap each other as much as possible.

In a period in which a voltage direction and a current direction coincide with each other in one electrical angle cycle, as in the conventional technique, current supply periods of three H-bridges are arranged so as not to overlap each other as much as possible, so that charge and discharge current of a smoothing capacitor can be suppressed.

However, since a motor has an inductance component, a current phase is delayed with respect to a voltage phase. Due to such a delay in a current phase, there is also a period in which a voltage direction and a current direction are opposite in one electrical angle cycle. Since phase current flows back to the smoothing capacitor in this period, if current supply periods of three H-bridges are arranged so as not to overlap with each other, charge and discharge current of the smoothing capacitor increases instead.

SUMMARY

One aspect of an exemplary power conversion device of the present invention includes a first three-phase full-bridge circuit connected to one end of a three-phase coil of an open-winding three-phase motor, a second three-phase full-bridge circuit connected to another end of the three-phase coil, and a control unit that individually controls voltage application time of the three-phase coil by controlling the first three-phase full-bridge circuit and the second three-phase full-bridge circuit by pulse width modulation. The control unit minimizes a width of a first time region in which voltage application time of an X-phase coil with a largest current value among the three-phase coils and voltage application time of a Y-phase coil with a second largest current value among the three-phase coils overlap within one control period of the pulse width modulation, and changes a position of a second time region occupied by voltage application time of a Z-phase coil within the one control period based on a target voltage application time length of each of the X-phase coil, the Y-phase coil, and the Z-phase coil and on a current direction of the Z-phase coil, the Z-phase coil having a smallest current value among the three-phase coils.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present invention will be described in detail with reference to the drawings.

Figure 1:
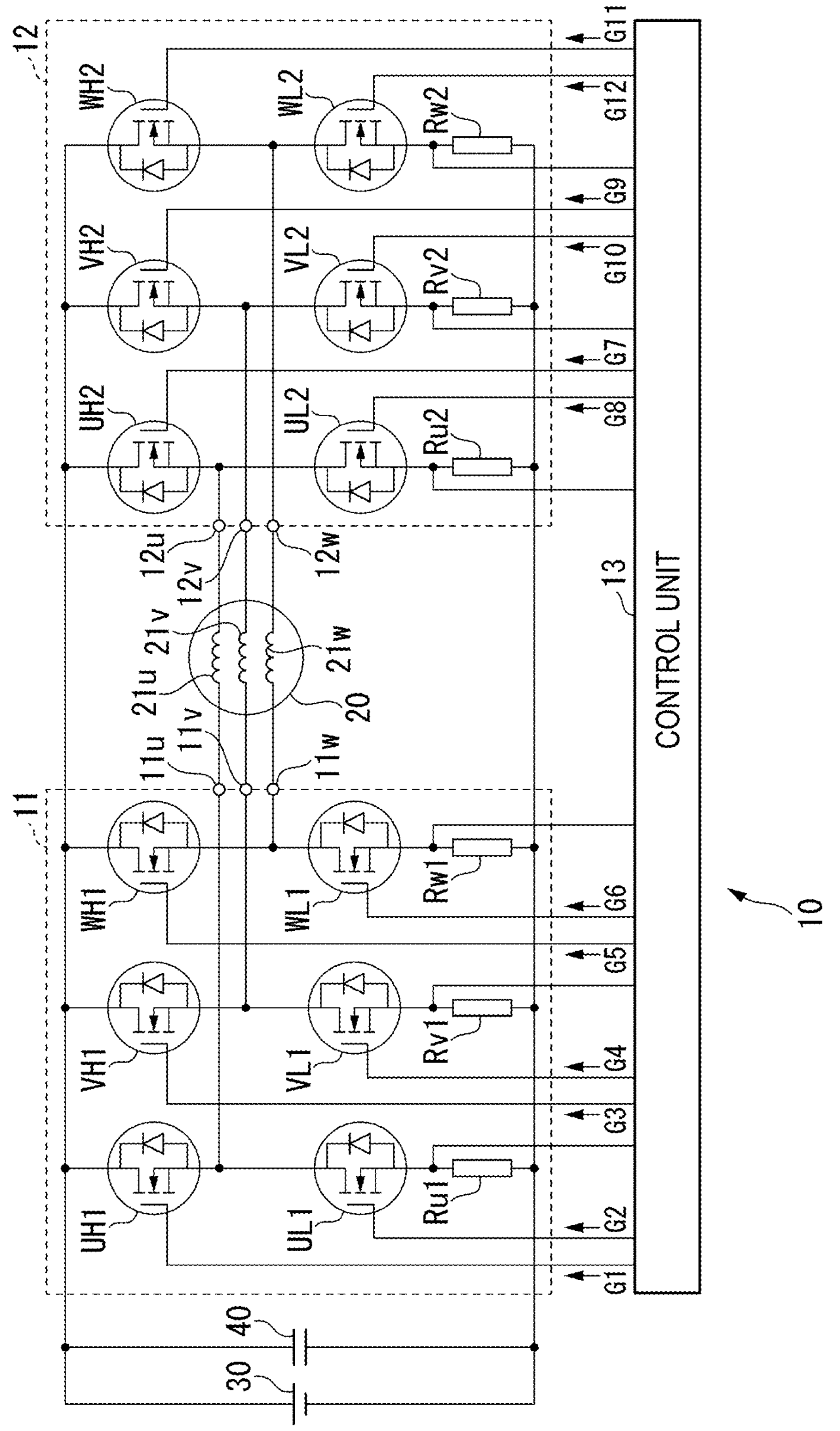
FIG. 1 is a diagram schematically illustrating a configuration of a power conversion device according to the present embodiment.

FIG. 1 is a diagram schematically illustrating a configuration of a power conversion device 10 according to the present embodiment. As illustrated in FIG. 1, the power conversion device 10 is connected to a motor 20. In the present embodiment, the motor 20 is an open-winding three-phase motor. For example, the motor 20 is a driving motor (traction motor) mounted on an electric vehicle.

The motor 20 includes a three-phase coil including a U-phase coil 21*u*, a V-phase coil 21*v*, and a W-phase coil 21*w*. Although not illustrated in FIG. 1, the motor 20 includes a motor case, and a rotor and a stator accommodated in the motor case. The rotor is a rotating body rotatably supported by a bearing component such as a rotor bearing inside the motor case. The rotor has an output shaft coaxially joined to the rotor in a state of penetrating the inner side in a radial direction of the rotor in an axial direction. The stator is set in a state of surrounding an outer peripheral surface of the rotor inside the motor case, and generates electromagnetic force necessary for rotating the rotor.

The U-phase coil 21*u*, the V-phase coil 21*v*, and the W-phase coil 21*w* are excitation coils provided in the stator. One end of the U-phase coil 21*u* is connected to a first U-phase connection terminal 11*u* of the power conversion device 10. Another end of the U-phase coil 21*u* is connected to a second U-phase connection terminal 12*u* of the power conversion device 10. One end of the V-phase coil 21*v* is connected to a first V-phase connection terminal 11*v* of the power conversion device 10. Another end of the V-phase coil 21*v* is connected to a second V-phase connection terminal 12*v* of the power conversion device 10. One end of the W-phase coil 21*w* is connected to a first W-phase connection terminal 11*w* of the power conversion device 10. Another end of the W-phase coil 21*w* is connected to a second W-phase connection terminal 12*w* of the power conversion device 10.

When energization states of the U-phase coil 21*u*, the V-phase coil 21*v*, and the W-phase coil 21*w* are controlled by the power conversion device 10, electromagnetic force necessary for rotating the rotor is generated. When the rotor rotates, an output shaft also rotates in synchronization with the rotor.

The power conversion device 10 includes a first three-phase full-bridge circuit 11, a second three-phase full-bridge circuit 12, and a control unit 13. The first three-phase full-bridge circuit 11 is connected to one end of a three-phase coil of the motor 20. The second three-phase full-bridge circuit 12 is connected to another end of the three-phase coil of the motor 20. Each of the first three-phase full-bridge circuit 11 and the second three-phase full-bridge circuit 12 is connected to a DC power supply 30.

The first three-phase full-bridge circuit 11 and the second three-phase full-bridge circuit 12 perform cooperative operation according to each gate signal output from the control unit 13, so that DC power and three-phase AC power are mutually converted between the DC power supply 30 and the motor 20. For example, when the first three-phase full-bridge circuit 11 and the second three-phase full-bridge circuit 12 operate as a dual inverter, the power conversion device 10 converts DC power supplied from the DC power supply 30 into three-phase AC power and outputs the three-phase AC power to the motor 20. As an example, the DC power supply 30 is one of a plurality of batteries mounted on an electric vehicle.

A smoothing capacitor 40 is connected in parallel to the DC power supply 30. The smoothing capacitor 40 may be a capacitor built in the power conversion device 10 or may be a capacitor provided outside the power conversion device 10.

The first three-phase full-bridge circuit 11 has a total of six switches including three high-side switches and three low-side switches. The first three-phase full-bridge circuit 11 includes a first U-phase high-side switch UH1, a first V-phase high-side switch VH1, a first W-phase high-side switch WH1, a first U-phase low-side switch UL1, a first V-phase low-side switch VL1, and a first W-phase low-side switch WL1. In the present embodiment, each switch included in the first three-phase full-bridge circuit 11 is, for example, a metal-oxide-semiconductor field-effect transistor (MOS-FET).

Further, the first three-phase full-bridge circuit 11 has three shunt resistors. The first three-phase full-bridge circuit 11 includes a first U-phase shunt resistor Ru1, a first V-phase shunt resistor Rv1, and a first W-phase shunt resistor Rw1.

Each of a drain terminal of the first U-phase high-side switch UH1, a drain terminal of the first V-phase high-side switch VH1, and a drain terminal of the first W-phase high-side switch WH1 is connected to a positive electrode terminal of the DC power supply 30 and one end of the smoothing capacitor 40.

A source terminal of the first U-phase low-side switch UL1 is connected to a negative electrode terminal of the DC power supply 30 and another end of the smoothing capacitor 40 via the first U-phase shunt resistor Ru1. A source terminal of the first V-phase low-side switch VL1 is connected to a negative electrode terminal of the DC power supply 30 and another end of the smoothing capacitor 40 via the first V-phase shunt resistor Rv1. A source terminal of the first W-phase low-side switch WL1 is connected to a negative electrode terminal of the DC power supply 30 and another end of the smoothing capacitor 40 via the first W-phase shunt resistor Rw1.

A source terminal of the first U-phase high-side switch UH1 is connected to each of the first U-phase connection terminal 11*u* and a drain terminal of the first U-phase low-side switch UL1. That is, a source terminal of the first U-phase high-side switch UH1 is connected to one end of the U-phase coil 21*u* via the first U-phase connection terminal 11*u*.

A source terminal of the first V-phase high-side switch VH1 is connected to each of the first V-phase connection terminal 11*v* and a drain terminal of the first V-phase low-side switch VL1. That is, a source terminal of the first V-phase high-side switch VH1 is connected to one end of the V-phase coil 21*v* via the first V-phase connection terminal 11*v*.

A source terminal of the first W-phase high-side switch WH1 is connected to each of the first W-phase connection terminal 11*w* and a drain terminal of the first W-phase low-side switch WL1. That is, a source terminal of the first W-phase high-side switch WH1 is connected to one end of the W-phase coil 21*w* via the first W-phase connection terminal 11*w*.

Each of a gate terminal of the first U-phase high-side switch UH1, a gate terminal of the first V-phase high-side switch VH1, and a gate terminal of the first W-phase high-side switch WH1 is connected to the control unit 13. Further, each of a gate terminal of the first U-phase low-side switch UL1, a gate terminal of the first V-phase low-side switch VL1, and a gate terminal of the first W-phase low-side switch WL1 is also connected to the control unit 13.

One end of the first U-phase shunt resistor Ru1 is connected to a source terminal of the first U-phase low-side switch UL1 and the control unit 13. One end of the first V-phase shunt resistor Rv1 is connected to a source terminal of the first V-phase low-side switch VL1 and the control unit 13. One end of the first W-phase shunt resistor Rw1 is connected to a source terminal of the first W-phase low-side switch WL1 and the control unit 13. Each of another end of the first U-phase shunt resistor Ru1, another end of the first V-phase shunt resistor Rv1, and another end of the first W-phase shunt resistor Rw1 is connected to a negative electrode terminal of the DC power supply 30.

The second three-phase full-bridge circuit 12 has a total of six switches including three high-side switches and three low-side switches. The second three-phase full-bridge circuit 12 includes a second U-phase high-side switch UH2, a second V-phase high-side switch VH2, a second W-phase high-side switch WH2, a second U-phase low-side switch UL2, a second V-phase low-side switch VL2, and a second W-phase low-side switch WL2. In the present embodiment, each switch included in the second three-phase full-bridge circuit 12 is, for example, a MOS-FET.

Further, the second three-phase full-bridge circuit 12 has three shunt resistors. The second three-phase full-bridge circuit 12 includes a second U-phase shunt resistor Ru2, a second V-phase shunt resistor Rv2, and a second W-phase shunt resistor Rw2.

Each of a drain terminal of the second U-phase high-side switch UH2, a drain terminal of the second V-phase high-side switch VH2, and a drain terminal of the second W-phase high-side switch WH2 is connected to a positive electrode terminal of the DC power supply 30 and one end of the smoothing capacitor 40.

A source terminal of the second U-phase low-side switch UL2 is connected to a negative electrode terminal of the DC power supply 30 and another end of the smoothing capacitor 40 via the second U-phase shunt resistor Ru2. A source terminal of the second V-phase low-side switch VL2 is connected to a negative electrode terminal of the DC power supply 30 and another end of the smoothing capacitor 40 via the second V-phase shunt resistor Rv2. A source terminal of the second W-phase low-side switch WL2 is connected to a negative electrode terminal of the DC power supply 30 and another end of the smoothing capacitor 40 via the second W-phase shunt resistor Rw2.

A source terminal of the second U-phase high-side switch UH2 is connected to each of the second U-phase connection terminal 12*u* and a drain terminal of the second U-phase low-side switch UL2. That is, a source terminal of the second U-phase high-side switch UH2 is connected to another end of the U-phase coil 21*u* via the second U-phase connection terminal 12*u*.

A source terminal of the second V-phase high-side switch VH2 is connected to each of the second V-phase connection terminal 12*v* and a drain terminal of the second V-phase low-side switch VL2. That is, a source terminal of the second V-phase high-side switch VH2 is connected to another end of the V-phase coil 21*v* via the second V-phase connection terminal 12*v*.

A source terminal of the second W-phase high-side switch WH2 is connected to each of the second W-phase connection terminal 12*w* and a drain terminal of the second W-phase low-side switch WL2. That is, a source terminal of the second W-phase high-side switch WH2 is connected to another end of the W-phase coil 21*w* via the second W-phase connection terminal 12*w*.

Each of a gate terminal of the second U-phase high-side switch UH2, a gate terminal of the second V-phase high-side switch VH2, and a gate terminal of the second W-phase high-side switch WH2 is connected to the control unit 13. Further, each of a gate terminal of the second U-phase low-side switch UL2, a gate terminal of the second V-phase low-side switch VL2, and a gate terminal of the second W-phase low-side switch WL2 is also connected to the control unit 13.

One end of the second U-phase shunt resistor Ru2 is connected to a source terminal of the second U-phase low-side switch UL2 and the control unit 13. One end of the second V-phase shunt resistor Rv2 is connected to a source terminal of the second V-phase low-side switch VL2 and the control unit 13. One end of the second W-phase shunt resistor Rw2 is connected to a source terminal of the second W-phase low-side switch WL2 and the control unit 13. Each of another end of the second U-phase shunt resistor Ru2, another end of the second V-phase shunt resistor Rv2, and another end of the second W-phase shunt resistor Rw2 is connected to a negative electrode terminal of the DC power supply 30.

In description below, the first three-phase full-bridge circuit 11 may be referred to as a "first inverter", and the second three-phase full-bridge circuit 12 may be referred to as a "second inverter". Further, in description below, six switches included in the first inverter 11 may be collectively referred to as "first switches", and six switches included in the second inverter 12 may be collectively referred to as "second switches".

The control unit 13 is a processor incorporating a memory (not illustrated). As an example, the control unit 13 is a microcontroller unit (MCU). The control unit 13 controls the first inverter 11 and the second inverter 12 according to a program stored in advance in the memory.

When U-phase current flows through the U-phase coil 21*u* via the first U-phase shunt resistor Ru1, voltage is generated in the first U-phase shunt resistor Ru1. The control unit 13 detects voltage of the first U-phase shunt resistor Ru1 as a first current value of the U-phase current. When U-phase current flows through the U-phase coil 21*u* via the second U-phase shunt resistor Ru2, voltage is generated in the second U-phase shunt resistor Ru2. The control unit 13 detects voltage of the second U-phase shunt resistor Ru2 as a second current value of the U-phase current.

When V-phase current flows through the V-phase coil 21*v* via the first V-phase shunt resistor Rv1, voltage is generated in the first V-phase shunt resistor Rv1. The control unit 13 detects voltage of the first V-phase shunt resistor Rv1 as a first current value of the V-phase current. When V-phase current flows through the V-phase coil 21*v* via the second V-phase shunt resistor Rv2, voltage is generated in the second V-phase shunt resistor Rv2. The control unit 13 detects voltage of the second V-phase shunt resistor Rv2 as a second current value of the V-phase current.

When W-phase current flows through the W-phase coil 21*w* via the first W-phase shunt resistor Rw1, voltage is generated in the first W-phase shunt resistor Rw1. The control unit 13 detects voltage of the first W-phase shunt resistor Rw1 as a first current value of the W-phase current. When W-phase current flows through the W-phase coil 21*w* via the second W-phase shunt resistor Rw2, voltage is generated in the second W-phase shunt resistor Rw2. The control unit 13 detects voltage of the second W-phase shunt resistor Rw2 as a second current value of the W-phase current.

The control unit 13 individually controls voltage application time of a three-phase coil by controlling the first inverter 11 and the second inverter 12 by pulse width modulation based on a detection result of the first current value and the second current value of each phase current. The control unit 13 generates a gate signal necessary for controlling the first switch included in the first inverter 11 and the second switch included in the second inverter 12 by pulse width modulation.

The control unit 13 generates a first U-phase high-side gate signal G1 and outputs the first U-phase high-side gate signal G1 to a gate terminal of the first U-phase high-side switch UH1. The control unit 13 generates a first U-phase low-side gate signal G2 and outputs the first U-phase low-side gate signal G2 to a gate terminal of the first U-phase low-side switch UL1. The first U-phase low-side gate signal G2 is a complementary signal of the first U-phase high-side gate signal G1.

The control unit 13 generates a first V-phase high-side gate signal G3 and outputs the first V-phase high-side gate signal G3 to a gate terminal of the first V-phase high-side switch VH1. The control unit 13 generates a first V-phase low-side gate signal G4 and outputs the first V-phase low-side gate signal G4 to a gate terminal of the first V-phase low-side switch VL1. The first V-phase low-side gate signal G4 is a complementary signal of the first V-phase high-side gate signal G3.

The control unit 13 generates a first W-phase high-side gate signal G5 and outputs the first W-phase high-side gate signal G5 to a gate terminal of the first W-phase high-side switch WH1. The control unit 13 generates a first W-phase low-side gate signal G6 and outputs the first W-phase low-side gate signal G6 to a gate terminal of the first W-phase low-side switch WL1. The first W-phase low-side gate signal G6 is a complementary signal of the first W-phase high-side gate signal G5.

The control unit 13 generates a second U-phase high-side gate signal G7 and outputs the second U-phase high-side gate signal G7 to a gate terminal of the second U-phase high-side switch UH2. The control unit 13 generates a second U-phase low-side gate signal G8, and outputs the second U-phase low-side gate signal G8 to a gate terminal of the second U-phase low-side switch UL2. The second U-phase low-side gate signal G8 is a complementary signal of the second U-phase high-side gate signal G7.

The control unit 13 generates a second V-phase high-side gate signal G9 and outputs the second V-phase high-side gate signal G9 to a gate terminal of the second V-phase high-side switch VH2. The control unit 13 generates a second V-phase low-side gate signal G10 and outputs the second V-phase low-side gate signal G10 to a gate terminal of the second V-phase low-side switch VL2. The second V-phase low-side gate signal G10 is a complementary signal of the second V-phase high-side gate signal G9.

The control unit 13 generates a second W-phase high-side gate signal G11 and outputs the second W-phase high-side gate signal G11 to a gate terminal of the second W-phase high-side switch WH2. The control unit 13 generates a second W-phase low-side gate signal G12 and outputs the second W-phase low-side gate signal G12 to a gate terminal of the second W-phase low-side switch WL2. The second W-phase low-side gate signal G12 is a complementary signal of the second W-phase high-side gate signal G11.

Note that dead time is inserted into each gate control signal in order to prevent a high-side switch and a low-side switch of the same phase from being simultaneously switched on.

The configuration of the power conversion device 10 has been described above. Hereinafter, before describing operation of the control unit 13 included in the power conversion device 10, the technical problem to be solved by the present invention and the gist of the present invention will be described in detail in order to facilitate understanding of the present invention.

Figure 2:
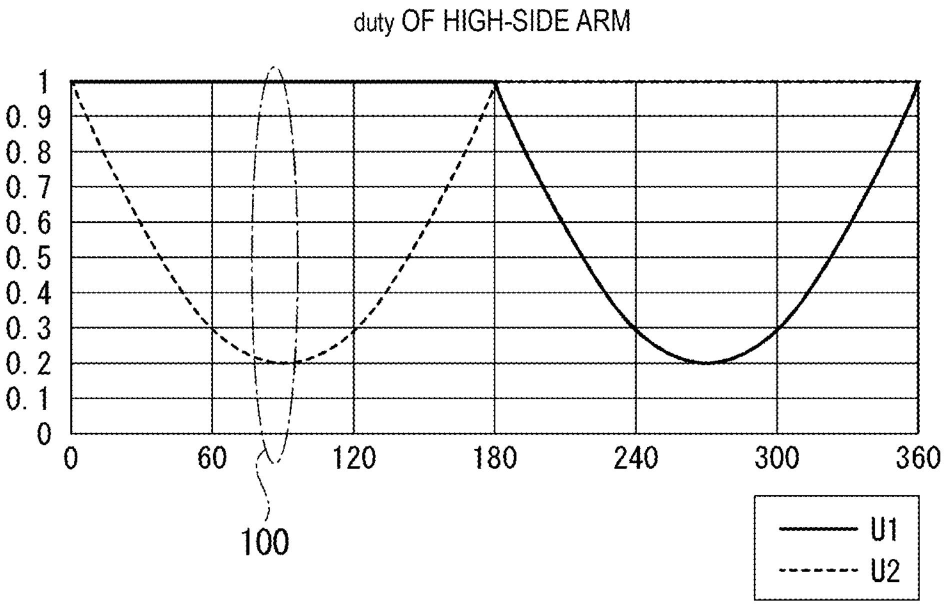
FIG. 2 is a first explanatory diagram relating to a technical problem.

As illustrated in FIG. 2, in a conventional technique, in each of three H-bridges of a dual inverter, a fixed potential leg in which a high-side arm is constantly turned on and a PWM leg are alternately switched every electrical angle of 180 degrees of a three-phase motor. FIG. 2 illustrates, as an example, a waveform of duty of a high-side arm of a first U-phase leg U1 and duty of a high-side arm of a second U-phase leg U2 in one electrical angle cycle. In FIG. 2, the vertical axis represents duty, and the horizontal axis represents an electrical angle (in units of [deg]) of the three-phase motor.

The first U-phase leg U1 is a U-phase leg included in one of two inverters included in the dual inverter. The second U-phase leg U2 is a U-phase leg included in the other of the two inverters included in the dual inverter. The first U-phase leg U1 and the second U-phase leg U2 constitute a U-phase H-bridge (see FIG. 4).

Figure 3:
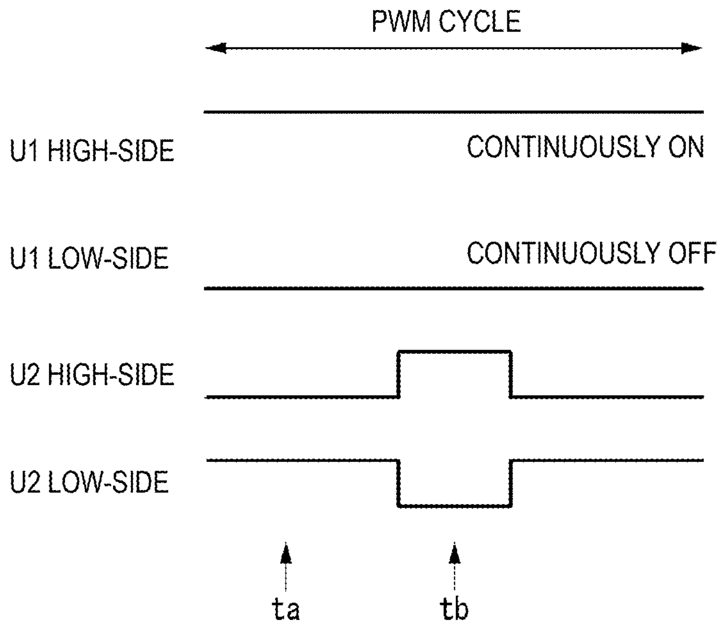
FIG. 3 is a second explanatory diagram relating to the technical problem.

In a region 100 surrounded by an alternate long and short dash line in one electrical angle cycle illustrated in FIG. 2, as illustrated in FIG. 3, a high-side arm of the first U-phase leg U1 is continuously turned on, a low-side arm of the first U-phase leg U1 is continuously turned off, a high-side arm of the second U-phase leg U2 is PWM-driven, and a low-side arm of the second U-phase leg U2 is complementarily driven with respect to a high-side arm of the second U-phase leg U2. In description below, "duty of a high-side arm" may be referred to as "high-side duty" or simply as "duty". Further, "high-side arm" is synonymous with "high-side switch", and "low-side arm" is synonymous with "low-side switch".

Figure 4:
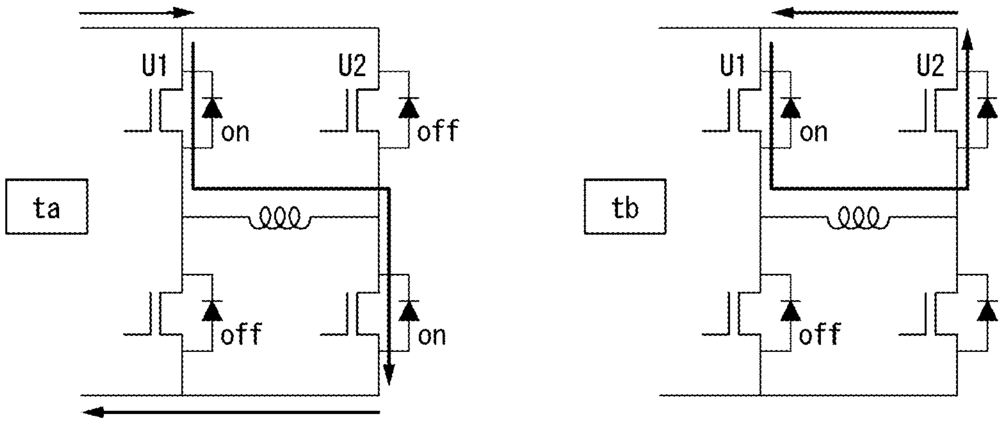
FIG. 4 is a third explanatory diagram relating to the technical problem.

The left diagram of FIG. 4 illustrates a path through which current flows through the U-phase H-bridge at a timing ta of FIG. 3. The right diagram of FIG. 4 illustrates a path through which current flows through the U-phase H-bridge at a timing tb of FIG. 3. The right diagram of FIG. 4 illustrates a current path in a recirculation period. Therefore, when dead time is ignored, as illustrated in the left diagram of FIG. 4, a difference between an on-period of the high-side arm of the first U-phase leg U1 and an on-period of the high-side arm of the second U-phase leg U2 is a current supply period of the U-phase H-bridge.

Figure 5:
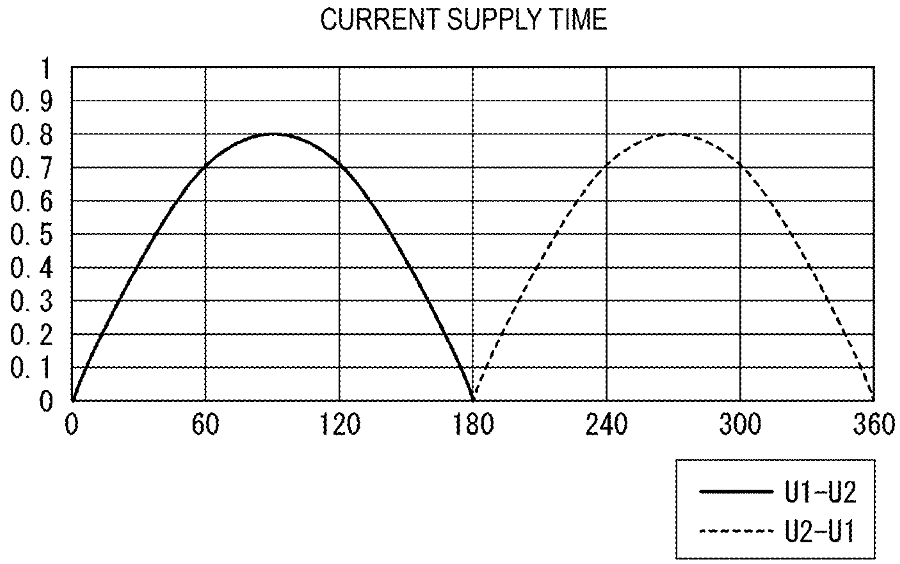
FIG. 5 is a fourth explanatory diagram relating to the technical problem.

FIG. 5 illustrates a waveform of current supply time of the U-phase H-bridge in one electrical angle cycle. In FIG. 5, the vertical axis represents current supply time, and the horizontal axis represents an electrical angle (in units of [deg]) of a three-phase motor. In a period of first half 180 degrees of one electrical angle cycle, high-side duty of the first U-phase leg U1 is equal to or more than high-side duty of the second U-phase leg U2 and is one. Therefore, a value obtained by subtracting the high-side duty of the second U-phase leg U2 from the high-side duty of the first U-phase leg U1 is the current supply time.

On the other hand, in a period of second half 180 degrees of one electrical angle cycle, high-side duty of the second U-phase leg U2 is equal to or more than high-side duty of the first U-phase leg U1 and is one. Therefore, a value obtained by subtracting the high-side duty of the first U-phase leg U1 from the high-side duty of the second U-phase leg U2 is the current supply time. Voltage directions in the U-phase H-bridge are opposite between a period of first half 180 degrees and a period of second half 180 degrees.

Furthermore, in the conventional technique, current supply periods of three H-bridges are arranged so as not to overlap each other as much as possible in one PWM cycle period. Here, in a case where a voltage direction (direction in which a difference in high-side duty becomes positive) coincides with a current direction, charge and discharge current of a smoothing capacitor can be suppressed as described below. Note that "current supply period" represents length of time during which current is supplied to a coil, but "current supply time" described in the present description is defined by a difference value of high-side duty as described above. That is, "current supply time" described in the present description represents a ratio of time during which current is supplied to a coil in one PWM cycle. In description below, "current supply period" and "current supply time" are intentionally used in different ways.

Figure 6:
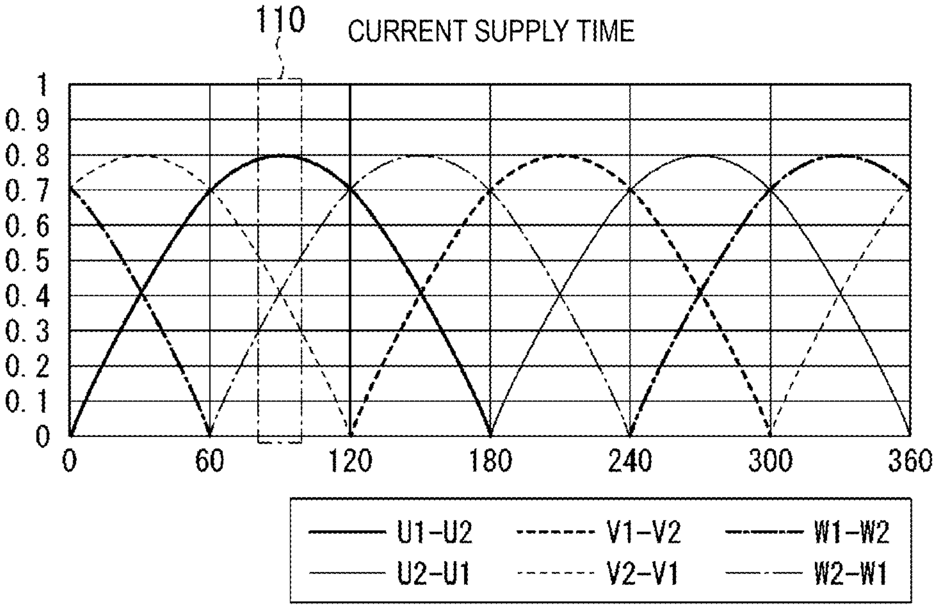
FIG. 6 is a fifth explanatory diagram relating to the technical problem.

FIG. 6 illustrates a waveform of current supply time of a U-phase H-bridge, a V-phase H-bridge, and a W-phase H-bridge in one electrical angle cycle. In FIG. 6, the vertical axis represents the current supply time, and the horizontal axis represents an electrical angle (in units of [deg]) of a three-phase motor. Similarly to the U-phase H-bridge, the V-phase H-bridge is constituted by a first V-phase leg V1 and a second V-phase leg V2, and the W-phase H-bridge is constituted by a first W-phase leg W1 and a second W-phase leg W2 (see FIG. 7).

Similarly to the U-phase H-bridge, in a period of first half 180 degrees of one electrical angle cycle (a period from 120 degrees to 300 degrees in FIG. 6), a value obtained by subtracting high-side duty of the second V-phase leg V2 from high-side duty of the first V-phase leg V1 is current supply time of the V-phase H-bridge. In a period of second half 180 degrees of one electrical angle cycle (a period of from 300 degrees to 360 degrees and a period from 0 degrees to 120 degrees in FIG. 6), a value obtained by subtracting high-side duty of the first V-phase leg V1 from high-side duty of the second V-phase leg V2 is current supply time of the V-phase H-bridge.

Similarly to the U-phase H-bridge, in a period of first half 180 degrees of one electrical angle cycle (a period from 240 degrees to 360 degrees and a period from 0 degrees to 60 degrees in FIG. 6), a value obtained by subtracting high-side duty of the second W-phase leg W2 from high-side duty of the first W-phase leg W1 is current supply time of the W-phase H-bridge. In a period of second half 180 degrees of one electrical angle cycle (a period of from 60 degrees to 240 degrees in FIG. 6), a value obtained by subtracting high-side duty of the first W-phase leg W1 from high-side duty of the second W-phase leg W2 is current supply time of the W-phase H-bridge. Waveforms of current supply time of three of the H-bridges have a phase difference of an electrical angle of 60 degrees from each other.

Figure 7:
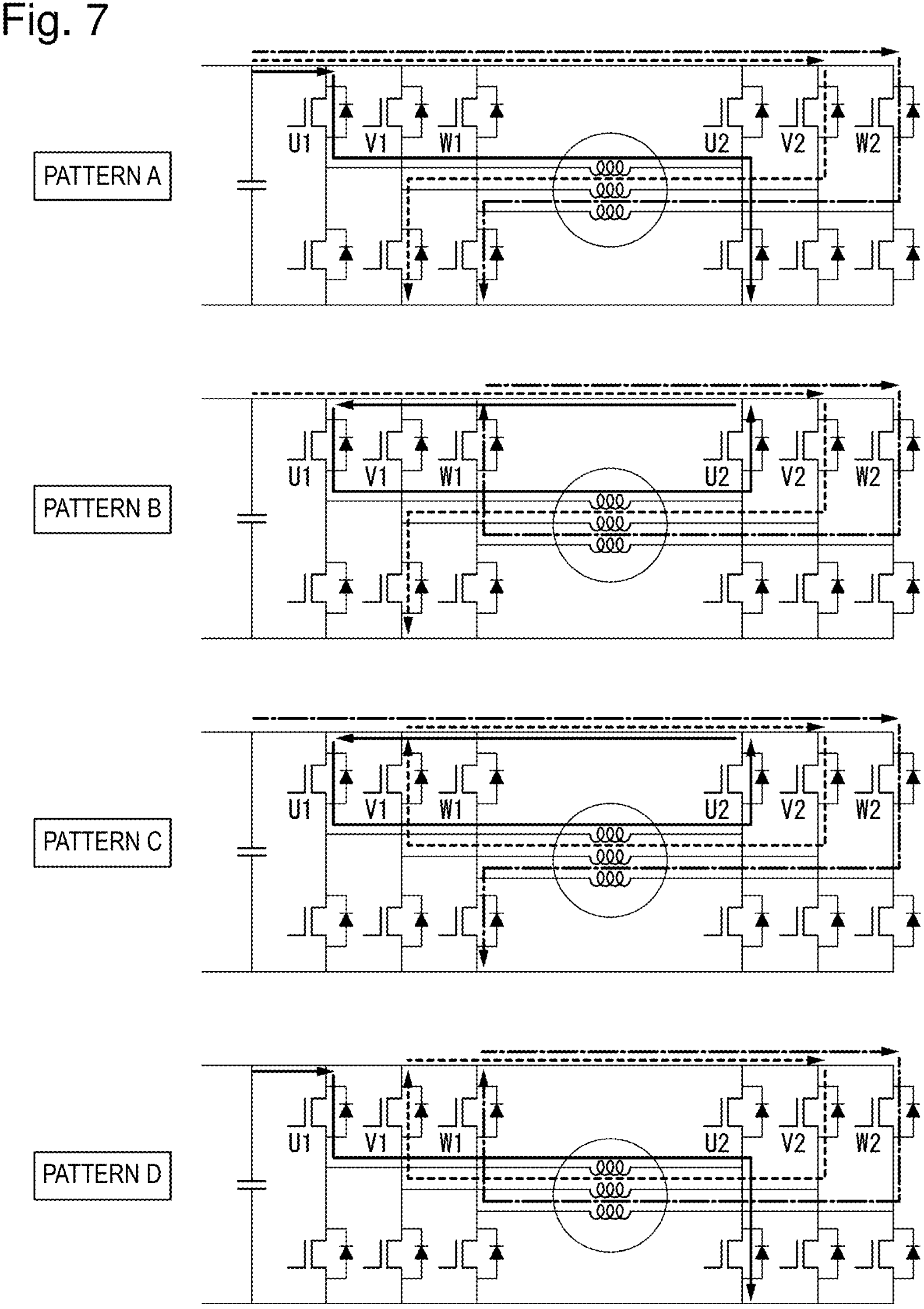
FIG. 7 is a sixth explanatory diagram relating to the technical problem.

When current supply periods of three of the H-bridges overlap each other in a region 110 surrounded by an alternate long and short dash line in one electrical angle cycle illustrated in FIG. 6, as illustrated in "Pattern A" in FIG. 7, it is necessary to simultaneously supply current to coils of all phases, and large discharge current is generated from a smoothing capacitor. In this case, the smoothing capacitor generates heat due to large charge and discharge current of the smoothing capacitor.

On the other hand, when current supply periods of three of the H-bridges are arranged so as not to overlap each other in one PWM cycle period, as illustrated in "Pattern B", "Pattern C", and "Pattern D" in FIG. 7, timings at which current is supplied to coils of phases are temporally dispersed, and charge and discharge current of the smoothing capacitor is suppressed. As a result, heat generation of the smoothing capacitor is suppressed, and an inexpensive capacitor having small capacity can be used as the smoothing capacitor. Note that, in FIG. 7, "Pattern B" indicates a current path during a current supply period of the V-phase H-bridge, "Pattern C" indicates a current path during a current supply period of the W-phase H-bridge, and "Pattern D" indicates a current path during a current supply period of the U-phase H-bridge.

An overview of the conventional technique and an effect of the technique have been described above.

In the above description, it is assumed that a voltage direction and a current direction coincide with each other. However, since a motor has an inductance component, a current phase is delayed with respect to a voltage phase. Due to such a delay in a current phase, there is also a period in which a voltage direction and a current direction are opposite in one electrical angle cycle.

Figure 8:
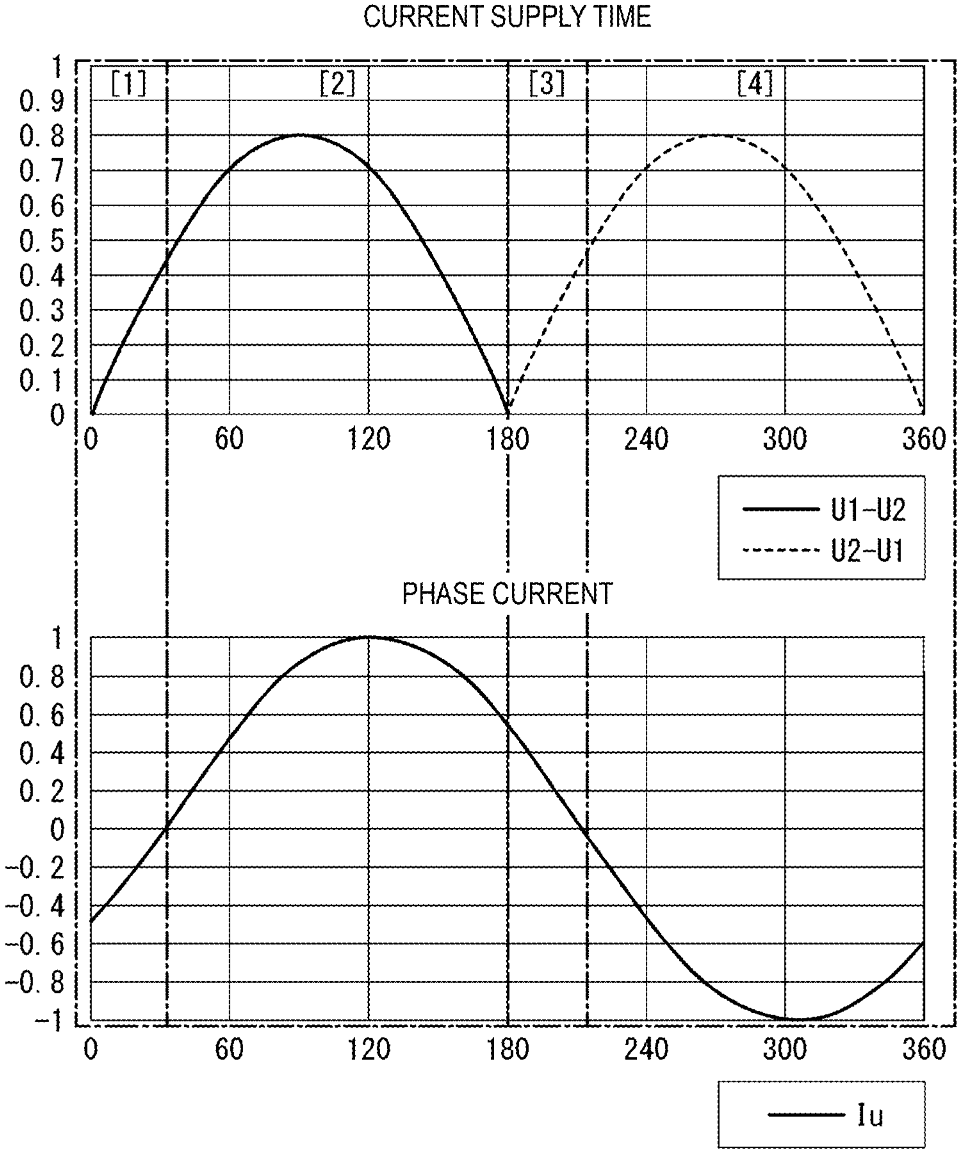
FIG. 8 is a seventh explanatory diagram relating to the technical problem.

FIG. 8 is a diagram illustrating a relationship between current supply time of the U-phase H-bridge and U-phase current Iu flowing through the U-phase H-bridge in one electrical angle cycle. In the upper diagram of FIG. 8, the vertical axis represents current supply time, and the horizontal axis represents an electrical angle (in units of [deg]) of a three-phase motor. In the lower diagram of FIG. 8, the vertical axis represents a current value (in units of [A]), and the horizontal axis represents an electrical angle (in units of [deg]) of a three-phase motor. FIG. 8 illustrates a case where a current phase is delayed by 30 degrees in electrical angle with respect to a voltage phase. In periods indicated by [2] and [4] in FIG. 8, since a voltage direction and a current direction coincide with each other, the U-phase current Iu flows through the U-phase H-bridge in the same path as a current path illustrated in the left diagram in FIG. 4 at the timing ta in FIG. 3.

Figure 9:
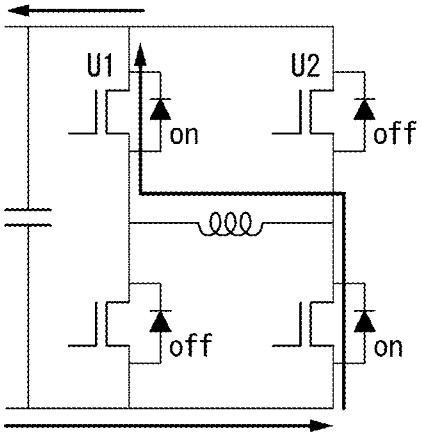
FIG. 9 is an eighth explanatory diagram relating to the technical problem.

On the other hand, since a voltage direction and a current direction are opposite in periods indicated by [1] and [3] in FIG. 8, as illustrated in FIG. 9, the U-phase current Iu flows through the U-phase H-bridge in a path of flowing backward to the smoothing capacitor at the timing ta in FIG. 3. In this way, when current supply periods of three of the H-bridges are arranged so as not to overlap each other in a period in which a voltage direction and a current direction are opposite, a problem below occurs.

Figure 10:
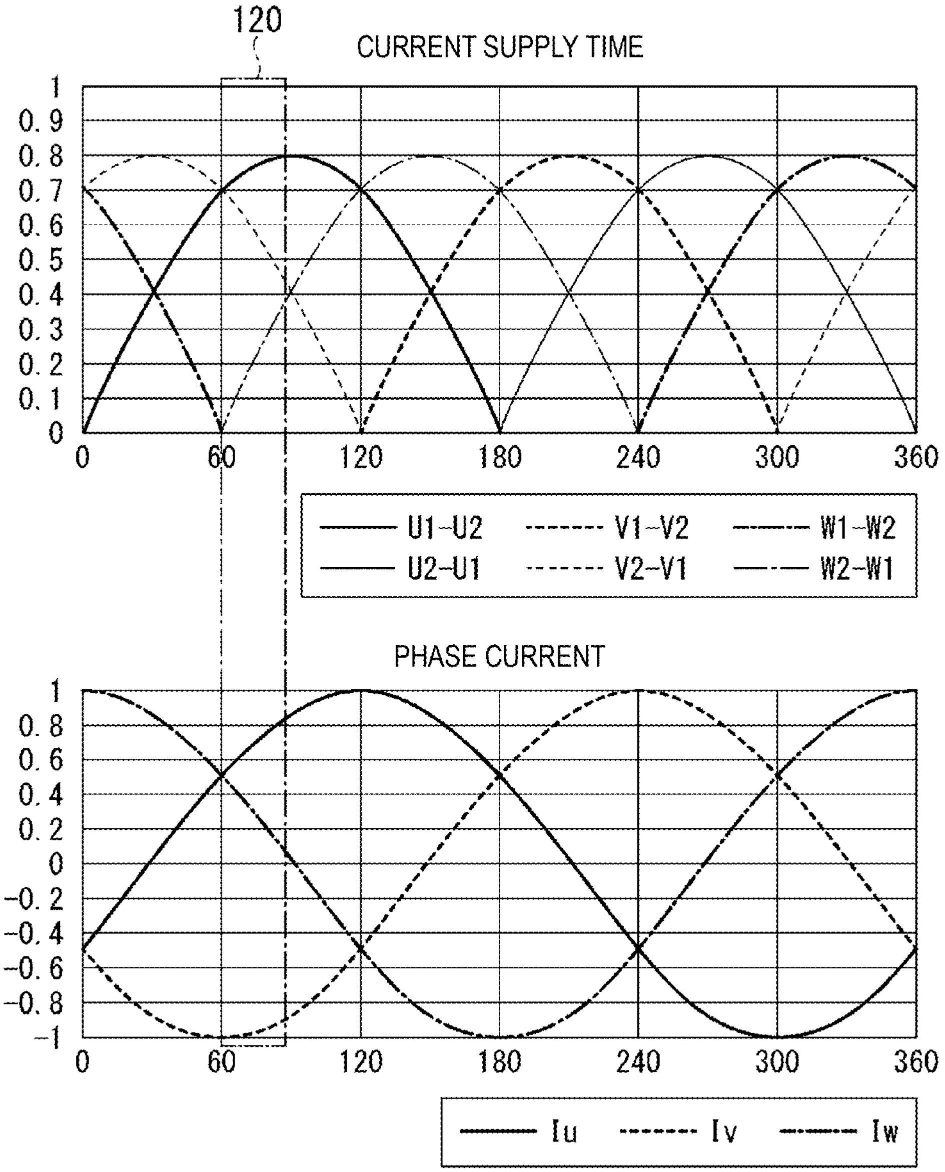
FIG. 10 is a ninth explanatory diagram relating to the technical problem.

FIG. 10 is a diagram illustrating a relationship between current supply time of the U-phase H-bridge and the U-phase current Iu flowing through the U-phase H-bridge in one electrical angle cycle, a relationship between current supply time of the V-phase H-bridge and V-phase current Iv flowing through the V-phase H-bridge in one electrical angle cycle, and a relationship between current supply time of the W-phase H-bridge and W-phase current Iw flowing through the W-phase H-bridge in one electrical angle cycle. In the upper diagram of FIG. 10, the vertical axis represents current supply time, and the horizontal axis represents an electrical angle (in units of [deg]) of a three-phase motor. In the lower diagram of FIG. 10, the vertical axis represents a current value (in units of [A]), and the horizontal axis represents an electrical angle (in units of [deg]) of a three-phase motor.

FIG. 10 illustrates a case where a current phase is delayed by 30 degrees in electrical angle with respect to a voltage phase in each phase. Focusing on a region 120 surrounded by an alternate long and short dash line in one electrical angle cycle illustrated in FIG. 10, a voltage direction is a negative direction (high-side duty of the second W-phase leg W2>high-side duty of the first W-phase leg W1) and a current direction is a positive direction in the W-phase H-bridge.

Figure 11:
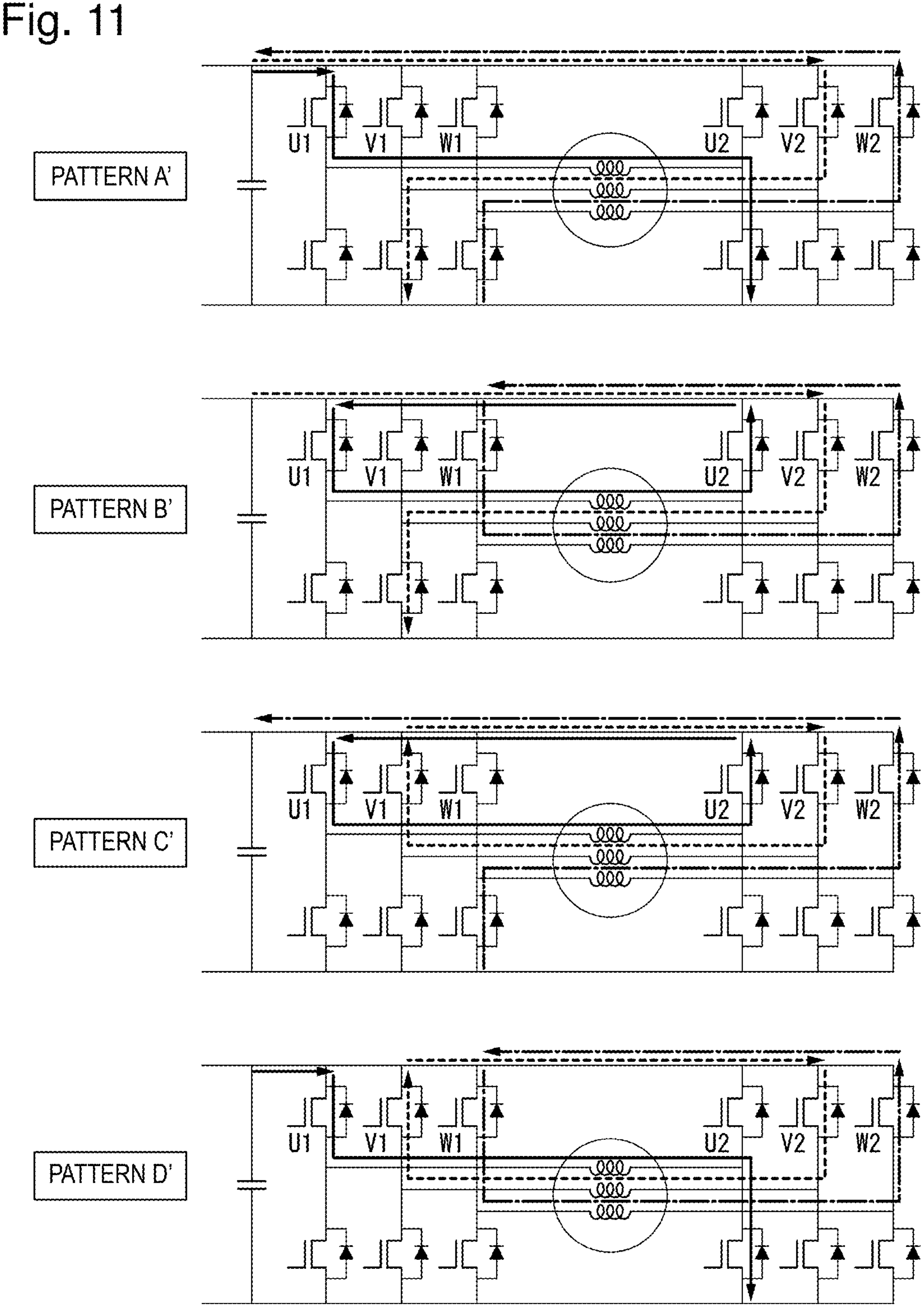
FIG. 11 is a tenth explanatory diagram relating to the technical problem.

When current supply periods of three of the H-bridges are arranged so as not to overlap each other in a state where the region 120 exists within one electrical angle cycle, the W-phase current Iw flows backward to the smoothing capacitor in a current supply period of the W-phase H-bridge as illustrated in "Pattern C'" of FIG. 11. As a result, total charge and discharge current of the smoothing capacitor increases in one electrical angle cycle, and it becomes difficult to sufficiently suppress heat generation of the smoothing capacitor. Note that, in FIG. 11, "Pattern B'" indicates a current path during a current supply period of the V-phase H-bridge, and "Pattern D'" indicates a current path during a current supply period of the U-phase H-bridge.

As described above, in a period in which a voltage direction and a current direction are opposite in one electrical angle cycle, phase current flows backward to the smoothing capacitor. Therefore, if current supply periods of three of the H-bridges are arranged so as not to overlap each other, charge and discharge current of the smoothing capacitor rather increases.

The present invention solves the technical problems described above. Further, it is known that two current supply periods that are relatively short among current supply periods of three of the H-bridges are preferentially overlapped, but this method does not sufficiently suppress charge and discharge current of the smoothing capacitor in some cases. The present invention also solves this technical problem.

Note that when current supply periods of three of the H-bridges overlap each other in a state where a period (the region 120) in which a voltage direction and a current direction are opposite exists within one electrical angle cycle, as illustrated in "Pattern A'" of FIG. 11, although currents flowing through the H-bridges overlap each other, current flows through the W-phase H-bridge in a direction (negative direction) of canceling current flowing through the U-phase H-bridge and the V-phase H-bridge. Note that this mechanism relates to the gist of the invention described below.

Hereinafter, before description of the gist of the present invention, the premise of the present invention will be described.

For example, focusing on a U phase, one high-side arm of the first U-phase leg U1 and the second U-phase leg U2 is turned on, and another low-side arm is turned on, so that power supply voltage is applied to both ends of a U-phase coil. In the present invention, a ratio of time (voltage application time) during which power supply voltage is applied to both ends of the U-phase coil to a PWM period only needs to be a desired value. That is, as long as a difference between high-side duty of the first U-phase leg U1 and high-side duty of the second U-phase leg U2 is a desired value required by motor control, a value of each high-side duty may be any value.

Figure 12:
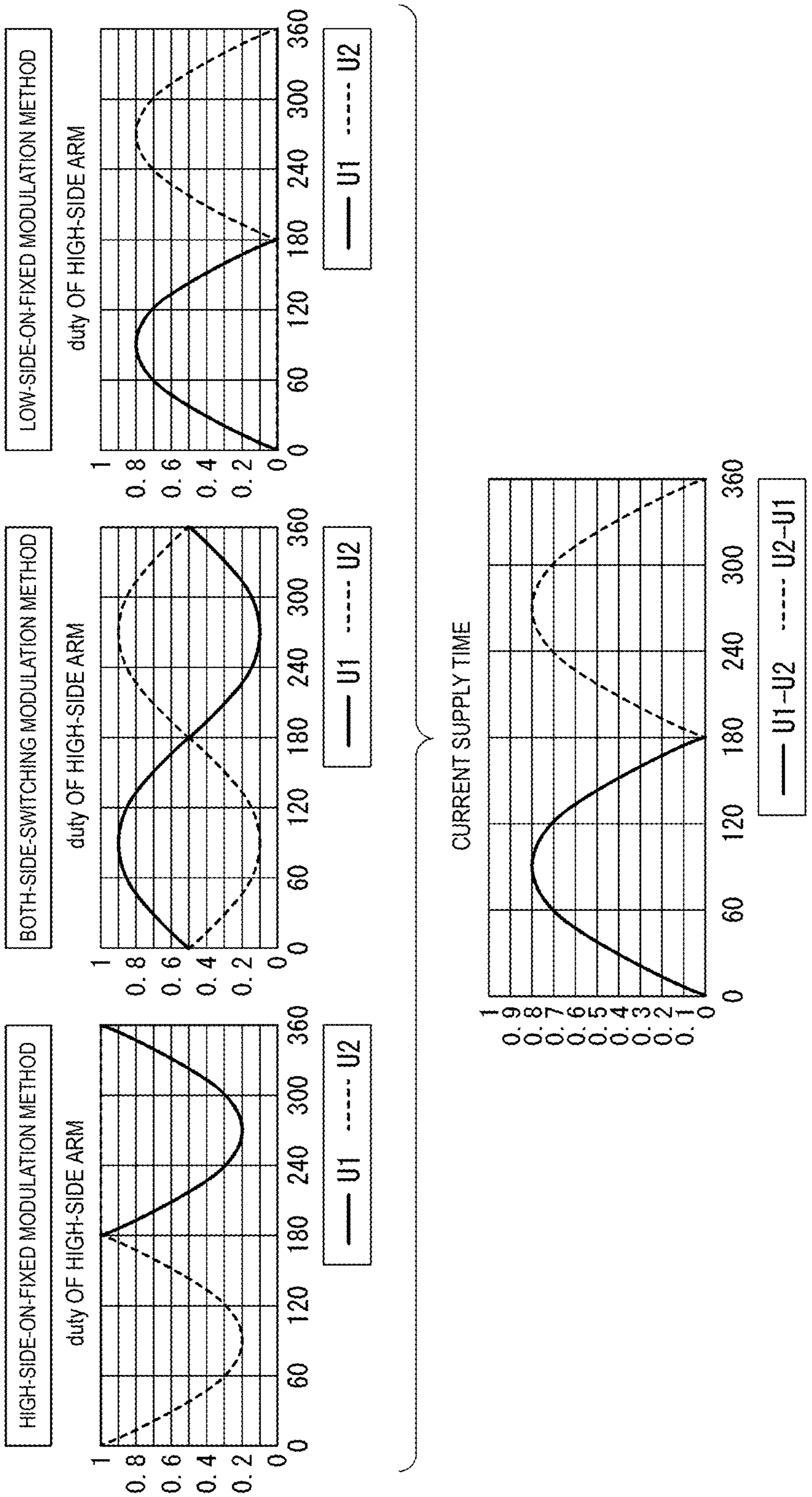
FIG. 12 is an eleventh explanatory diagram relating to the technical problem.

The upper left diagram in FIG. 12 illustrates waveforms of high-side duty of the first U-phase leg U1 and high-side duty of the second U-phase leg U2 in a case where a U-phase H-bridge is controlled by a high-side-on-fixed modulation method in one electrical angle cycle. The high-side-on-fixed modulation method is to fix one high-side arm of the first U-phase leg U1 and the second U-phase leg U2 to be turned on and to control another low-side arm by pulse width modulation.

The upper right diagram in FIG. 12 illustrates waveforms of high-side duty of the first U-phase leg U1 and high-side duty of the second U-phase leg U2 in a case where a U-phase H-bridge is controlled by a low-side-on-fixed modulation method in one electrical angle cycle. The low-side-on-fixed modulation method is to fix one low-side arm of the first U-phase leg U1 and the second U-phase leg U2 to be turned on and to control another high-side arm by pulse width modulation.

The upper middle diagram in FIG. 12 illustrates waveforms of high-side duty of the first U-phase leg U1 and high-side duty of the second U-phase leg U2 in a case where a U-phase H-bridge is controlled by a both-side-switching modulation method in one electrical angle cycle. The both-side-switching modulation method is to control both one high-side arm and another low-side arm of the first U-phase leg U1 and the second U-phase leg U2 by pulse width modulation. In the three upper diagrams in FIG. 12, the vertical axis represents duty, and the horizontal axis represents an electrical angle (in units of [deg]) of a three-phase motor.

The lower diagram of FIG. 12 illustrates a waveform of current supply time of a U-phase H-bridge in one electrical angle cycle. In the lower diagram of FIG. 12, the vertical axis represents current supply time, and the horizontal axis represents an electrical angle (in units of [deg]) of a three-phase motor. In each case illustrated in the three upper diagrams of FIG. 12, when a difference between high-side duty of the first U-phase leg U1 and high-side duty of the second U-phase leg U2 is calculated as current supply time of a U-phase H-bridge, a waveform of current supply time of each case is a waveform as illustrated in the lower diagram of FIG. 12.

As described above, if a difference between high-side duty of the first U-phase leg U1 and high-side duty of the second U-phase leg U2 is calculated as current supply time of a U-phase H-bridge, a waveform of the same current supply time can be obtained regardless of a modulation method. Therefore, in the present invention, it is not necessary to limit a modulation method to a specific modulation method. Therefore, a modulation method may be switched during a period in which a motor is controlled. Note that, as described later, the high-side-on-fixed modulation method and the low-side-on-fixed modulation method have an advantage that a switching loss can be reduced.

Although the premise of the present invention has been described above, the above description also applies to a V phase and a W phase.

Hereinafter, the gist of the present invention will be described.

Figure 13:
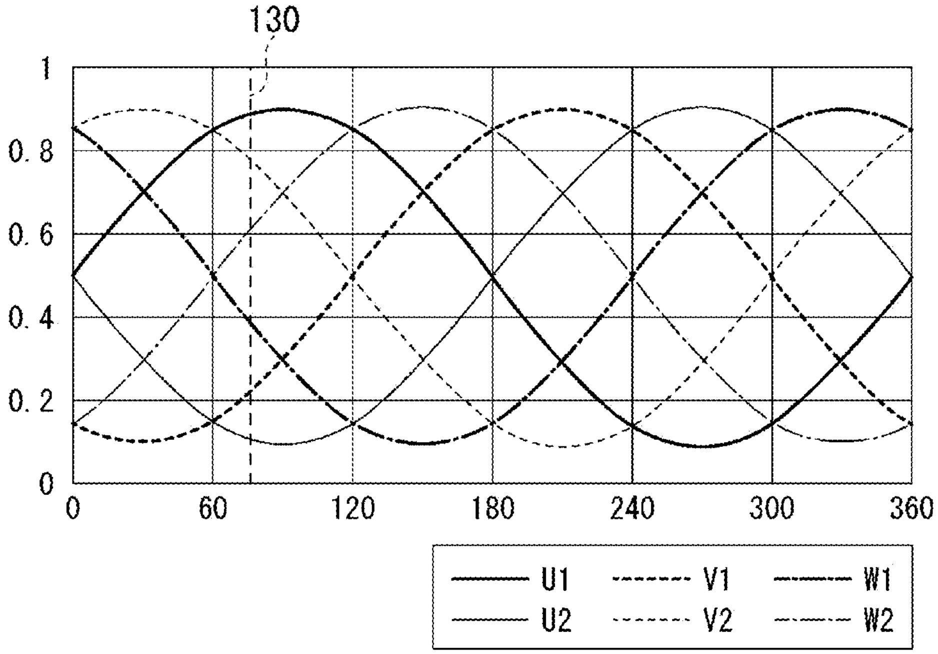
FIG. 13 is a twelfth explanatory diagram relating to the technical problem.

FIG. 13 is a diagram illustrating a waveform of high-side duty of each leg in a case where each of three H-bridges is controlled by the both-side-switching modulation method. In FIG. 13, the vertical axis represents duty, and the horizontal axis represents an electrical angle (in units of [deg]) of the three-phase motor.

Figure 14:
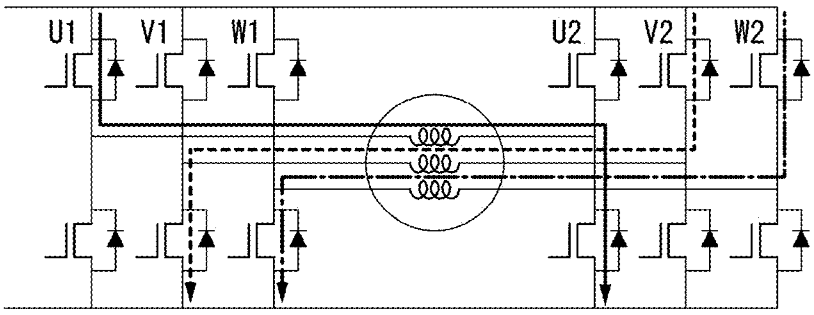
FIG. 14 is a thirteenth explanatory diagram relating to the technical problem.

Focusing on a range of 60 degrees to 120 degrees of one electrical angle cycle illustrated in FIG. 13, high-side duty of the first U-phase leg U1 is greater than high-side duty of the second U-phase leg U2, high-side duty of the second V-phase leg V2 is greater than high-side duty of the first V-phase leg V1, and high-side duty of the second W-phase leg W2 is greater than high-side duty of the first W-phase leg W1. In this case, current flows through a path as illustrated in FIG. 14 in a current supply period for each of three of the H-bridges. FIG. 14 illustrates an example of power running operation. However, as will be described later, note that current may flow in a direction opposite to an arrow line illustrated in FIG. 14.

Figure 15:
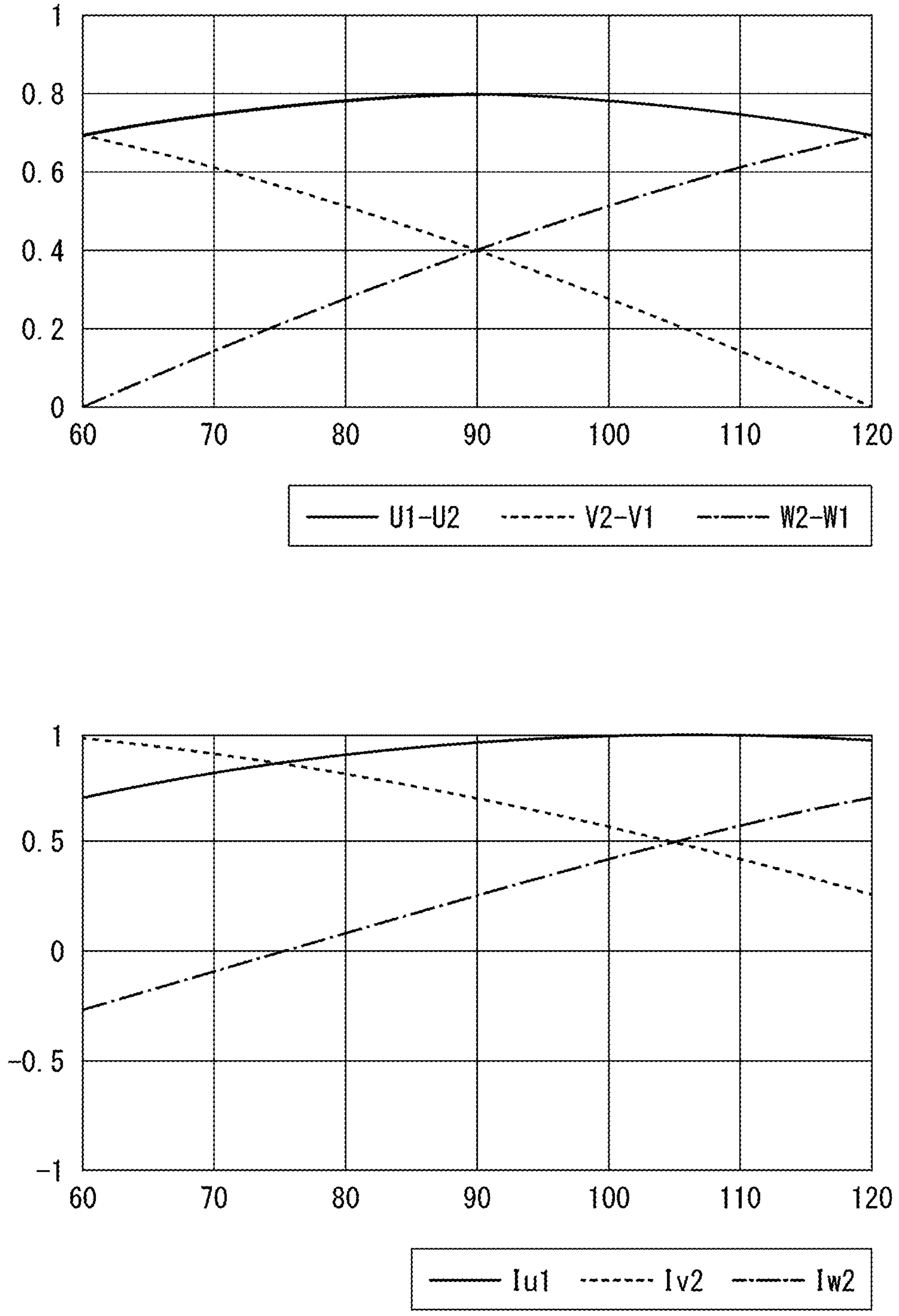
FIG. 15 is a fourteenth explanatory diagram relating to the technical problem.

The upper diagram in FIG. 15 illustrates a duty difference (voltage difference) obtained by subtracting high-side duty of the second U-phase leg U2 from high-side duty of the first U-phase leg U1 in a range of 60 degrees to 120 degrees. The upper diagram in FIG. 15 illustrates a duty difference obtained by subtracting high-side duty of the first V-phase leg V1 from high-side duty of the second V-phase leg V2 in a range of 60 degrees to 120 degrees. Furthermore, the upper diagram in FIG. 15 illustrates a duty difference obtained by subtracting high-side duty of the first W-phase leg W1 from high-side duty of the second W-phase leg W2 in a range of 60 degrees to 120 degrees. In the upper diagram of FIG. 15, the vertical axis represents a duty difference, and the horizontal axis represents an electrical angle (in units of [deg]) of a three-phase motor.

The lower diagram of FIG. 15 illustrates a waveform of current flowing through an H-bridge of each phase in a range of 60 degrees to 120 degrees. In the lower diagram of FIG. 15, the vertical axis represents a current value (in units of [A]), and the horizontal axis represents an electrical angle (in units of [deg]) of a three-phase motor. As an example, the lower diagram of FIG. 15 illustrates a case where a current phase has a delay of 15 degrees with respect to a voltage phase in power running operation.

A duty difference illustrated in the upper diagram of FIG. 15 corresponds to time (current supply period) for supplying current from a power supply to a coil of each phase, and remaining time corresponds to a recirculation period. The present invention is similar to the conventional technique in that charge and discharge current of the smoothing capacitor is suppressed by temporally dispersing current supply periods of phases.

Figure 16:
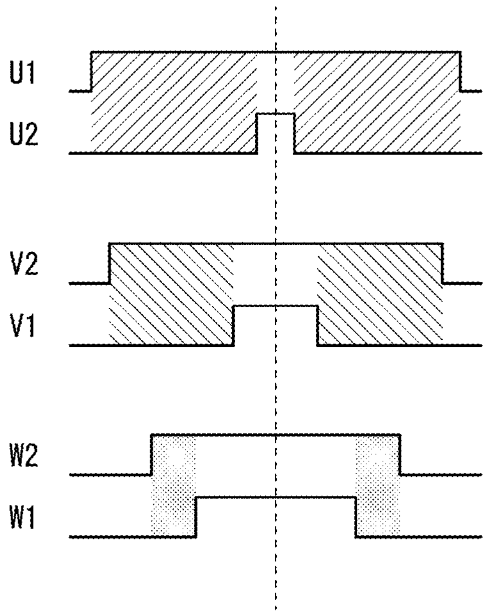
FIG. 16 is a fifteenth explanatory diagram relating to the technical problem.

When duty of each leg at the electrical angle indicated by a vertical dotted line 130 in one electrical angle cycle illustrated in FIG. 13 is represented by a PWM waveform, a waveform as illustrated in FIG. 16 is obtained. In a PWM waveform of each phase illustrated in FIG. 16, a hatched region corresponds to a current supply period, and remaining time corresponds to a recirculation period. Note that in description below, "current supply period" is rephrased as "voltage application time". The voltage application time is time during which power supply voltage is applied between terminals of a coil, and is equal to a current supply period.

In order to suppress charge and discharge current of the smoothing capacitor, it is desirable to arrange voltage application time of a phase having largest current and voltage application time of a phase having second largest current so as not to overlap each other as much as possible in one PWM cycle. That is, in the present invention, basically, in one PWM cycle, one of a phase with largest current and a phase with second largest current is controlled by the high-side-on-fixed modulation method, and the other is controlled by the low-side-on-fixed modulation method.

However, since a current phase is delayed with respect to a voltage phase, there is a time zone in which current in a negative direction flows in a phase with smallest current in one electrical angle cycle. Therefore, in the present invention, in a case where current in a positive direction flows through a phase with smallest current, in one PWM cycle, whether to minimize overlap between voltage application time of a phase with smallest current and voltage application time of a phase with largest current or to minimize length of time during which voltage application times of all phases overlap is selected by a determination formula. By the above, in a case where current in a positive direction flows through a phase with smallest current, charge and discharge current of the smoothing capacitor can be more effectively suppressed.

Further, in the present invention, in a case where current in a negative direction flows through a phase with smallest current, voltage application time of a phase with smallest current is preferentially caused to overlap voltage application time of a phase with largest current in one PWM cycle. In a case where there is a time region in which voltage application time of a phase with largest current and voltage application time of a phase with second largest current overlap, voltage application time of a phase with smallest current is more preferentially caused to overlap the time region. By the above, in a case where current in a negative direction flows through a phase with smallest current, charge and discharge current of the smoothing capacitor can be more effectively suppressed.

The gist of the present invention has been described above. Hereinafter, operation of the control unit 13 included in the power conversion device 10 will be described based on the gist of the present invention.

The control unit 13 included in the power conversion device 10 of the present embodiment minimizes a width of a first time region in which voltage application time of an X-phase coil with a largest current value among three-phase coils of the motor 20 and voltage application time of a Y-phase coil with a second largest current value among the three-phase coils overlap within one control period of pulse width modulation. Further, the control unit 13 changes a position of a second time region occupied by voltage application time of a Z-phase coil within one control period of pulse width modulation based on target voltage application time length of each of the X-phase coil, the Y-phase coil, and a Z-phase coil with a smallest current value among the three-phase coils and a current direction of the Z-phase coil.

The control unit 13 compares the magnitudes of a three-phase AC waveform and a carrier waveform so as to generate gate signals G1 to G12. As an example, the carrier waveform is a triangular wave. For example, the control unit 13 generates a three-phase AC waveform based on a torque command value or a speed command value from a host control device and a detection result of a rotation angle and each phase current of the motor 20. Since generating a three-phase AC waveform in this manner is a publicly-known technique in the field of motor control, description of a method of generating a three-phase AC waveform is omitted.

As described above, in a case where a carrier waveform is a triangular wave, one control period of pulse width modulation corresponds to one period of the carrier waveform. In description below, one control period of pulse width modulation may be referred to as "one PWM cycle". Further, in description below, a case where the control unit 13 executes center alignment PWM in which duty is updated once in one PWM cycle is assumed. Note that, as is well known, duty is a value obtained by dividing pulse width of a gate signal generated within one PWM cycle by time corresponding to one PWM cycle.

Definitions of "current value" in "X-phase coil with a largest current value among three-phase coils", "Y-phase coil with a second largest current value among three-phase coils", and "Z-phase coil with a smallest current value among three-phase coils" are different between a case of power running operation and a case of regenerative operation. That is, in the case of power running operation, "current value" means a value of phase current in which a direction from a switch controlled with larger duty between the first switches and the second switches to a switch controlled with smaller duty between the first switches and the second switches is a positive current direction in each phase. Further, in the case of regenerative operation, "current value" means a value of phase current in which a direction from a switch controlled with smaller duty between the first switches and the second switches to a switch controlled with larger duty between the first switches and the second switches is a positive current direction in each phase. Hereinafter, the case of power running operation will be described as an example.

In description below, of the first switches and the second switches, a switch controlled with larger duty may be referred to as a "high-duty switch". Further, among the first switches and the second switches, a switch controlled with smaller duty may be referred to as a "low-duty switch".

In each phase, in a case where phase current flows in a positive current direction, that is, in a direction from the high-duty switch to the low-duty switch, a current value of the phase current is a positive value. On the other hand, in each phase, in a case where phase current flows in a negative current direction, that is, in a direction from the low-duty switch to the high-duty switch, a current value of the phase current is a negative value. In description below, phase current flowing through an X-phase coil may be referred to as "X-phase current", phase current flowing through a Y-phase coil may be referred to as "Y-phase current", and phase current flowing through a Z-phase coil may be referred to as "Z-phase current".

Although details will be described later, in a case where a current direction of the Z-phase coil is a positive direction, that is, in a case where the current value Iz of the Z-phase current is a positive value, the control unit 13 determines a modulation method of a three-phase coil and a position of the second time region based on success or failure of at least one of Conditional expressions (1) to (9) below, so as to minimize width of a third time region in which voltage application time of the Z-phase coil and voltage application time of the X-phase coil overlap each other or minimize width of a fourth time region in which voltage application time of the Z-phase coil and the first time region overlap each other.

$$\Delta X + \Delta Y \geq 1 \tag{1}$$

$$\Delta X + \Delta Z \geq 1 \tag{2}$$

$$\Delta X \geq \Delta Z \tag{3}$$

$$\Delta Y + \Delta Z \geq 1 \tag{4}$$

$$\Delta Y \geq \Delta Z \tag{5}$$

$$(1 - \Delta X) \cdot Ix - (1 - \Delta Y) \cdot Iy \geq 0 \tag{6}$$

$$(1 - \Delta X) \cdot Ix - (1 - \Delta Z) \cdot Iy \geq 0 \tag{7}$$

$$(1 - \Delta X) \cdot Ix - \Delta Z \cdot Iy \geq 0 \tag{8}$$

$$(1 - \Delta X) \cdot Ix - \Delta Y \cdot Iy \geq 0 \tag{9}$$

On the other hand, in a case where the current direction of the Z-phase coil is a negative direction, that is, in a case where the current value Iz of the Z-phase current is a negative value, the control unit 13 determines a modulation method of a three-phase coil and a position of the second time region based on success or failure of at least one of Conditional expressions (1), (3), and (10) below, so as to maximize width of the third time region in which voltage application time of the Z-phase coil and voltage application time of the X-phase coil overlap each other and maximize width of the fourth time region in which voltage application time of the Z-phase coil and the first time region overlap each other.

$$\Delta X + \Delta Y \geq 1 \tag{1}$$

$$\Delta X \geq \Delta Z \tag{3}$$

$$\Delta X + \Delta Y \geq \Delta Z + 1 \tag{10}$$

In Conditional expressions (1) to (10), ΔX is a target voltage application time length of the X-phase coil, ΔY is a target voltage application time length of the Y-phase coil, and ΔZ is a target voltage application time length of the Z-phase coil. The target voltage application time length ΔX of the X-phase coil is expressed by Expression (11) below. The target voltage application time length ΔY of the Y-phase coil is expressed by Expression (12) below. The target voltage application time length ΔZ of the Z-phase coil is expressed by Expression (13) below. However, in Expressions (11) to (12) below, influence of dead time Td is ignored. In a case where influence of the dead time Td is considered, 2Td is subtracted from the left side of each expression.

$$\Delta X = X2 - X1 \tag{11}$$

$$\Delta Y = Y2 - Y1 \tag{12}$$

$$\Delta Z = Z2 - Z1 \tag{13}$$

In Expression (11), X2 is duty of the high-duty switch connected to the X-phase coil, and X1 is duty of the low-duty switch connected to the X-phase coil. In Expression (12), Y2 is duty of the high-duty switch connected to the Y-phase coil, and Y1 is duty of the low-duty switch connected to the Y-phase coil. In Expression (13), Z2 is duty of the high-duty switch connected to the Z-phase coil, and Z1 is duty of the low-duty switch connected to the Z-phase coil.

The target voltage application time lengths ΔX, ΔY, and ΔZ are target values of length of voltage application time required by motor control in one PWM cycle. The control unit 13 determines the duties X1, X2, Y1, Y2, 21, and Z2 that achieve the target voltage application time lengths ΔX, ΔY, and ΔZ required by motor control in one PWM cycle.

In the present embodiment, "voltage application time" is a term defined as time during which power supply voltage is applied between terminals of a coil, but is not a term representing length of time itself, and is a term representing a time zone or a time region during which power supply voltage is applied between terminals of a coil. On the other hand, "target voltage application time length" is a term defined as a target value of "length of voltage application time" as described above, and is a term representing length of time itself.

In Conditional expressions (6) to (9), Ix is a current value of the X-phase coil, that is, a current value of x-phase current, and Iy is a current value of the Y-phase coil, that is, a current value of Y-phase current. In the present embodiment, modulation methods include the high-side-on-fixed modulation method, the low-side-on-fixed modulation method, and the both-side-switching modulation method.

The high-side-on-fixed modulation method is to fix one i-phase high-side switch (i is any of X, Y, and Z) of the first inverter 11 and the second inverter 12 to be turned on and control another i-phase low-side switch by pulse width modulation. The low-side-on-fixed modulation method is to fix one i-phase low-side switch of the first inverter 11 and the second inverter 12 to be turned on and control another i-phase high-side switch by pulse width modulation. The both-side-switching modulation method is to control both of one i-phase high-side switch and another i-phase low-side switch of the first inverter 11 and the second inverter 12 by pulse width modulation.

Note that, in each of a U phase, a V phase, and a W phase of the first inverter 11 and a U phase, a V phase, and a W phase of the second inverter 12, during a period in which phase current is in a direction from a connection terminal of each phase toward the motor 20, a low-side switch serves as a rectifier element, and thus pulse width modulation of the low-side switch may be omitted and the low-side switch may be continuously turned off. Also in this case, a high-side switch is driven by pulse width modulation similarly to a case where pulse width modulation of a low-side switch is not omitted. Similarly, during a period in which phase current is directed from the motor 20 to a connection terminal of each phase, a high-side switch serves as a rectifier element, and thus pulse width modulation of the high-side switch may be omitted and the high-side switch may be continuously turned off. Also in this case, a low-side switch is driven by a complementary signal similarly to a case where the pulse width modulation of a high-side switch is not omitted. Further, even in a case where pulse width modulation of a high-side switch is omitted, duty of the high-side switch is defined as a value equivalent to that in a case where pulse width modulation is not omitted.

Hereinafter, operation of the control unit 13 will be described in detail with reference to FIGS. 17 to 20. FIGS. 17 to 20 are flowcharts illustrating each piece of processing executed by the control unit 13 within one PWM cycle.

Figure 17:
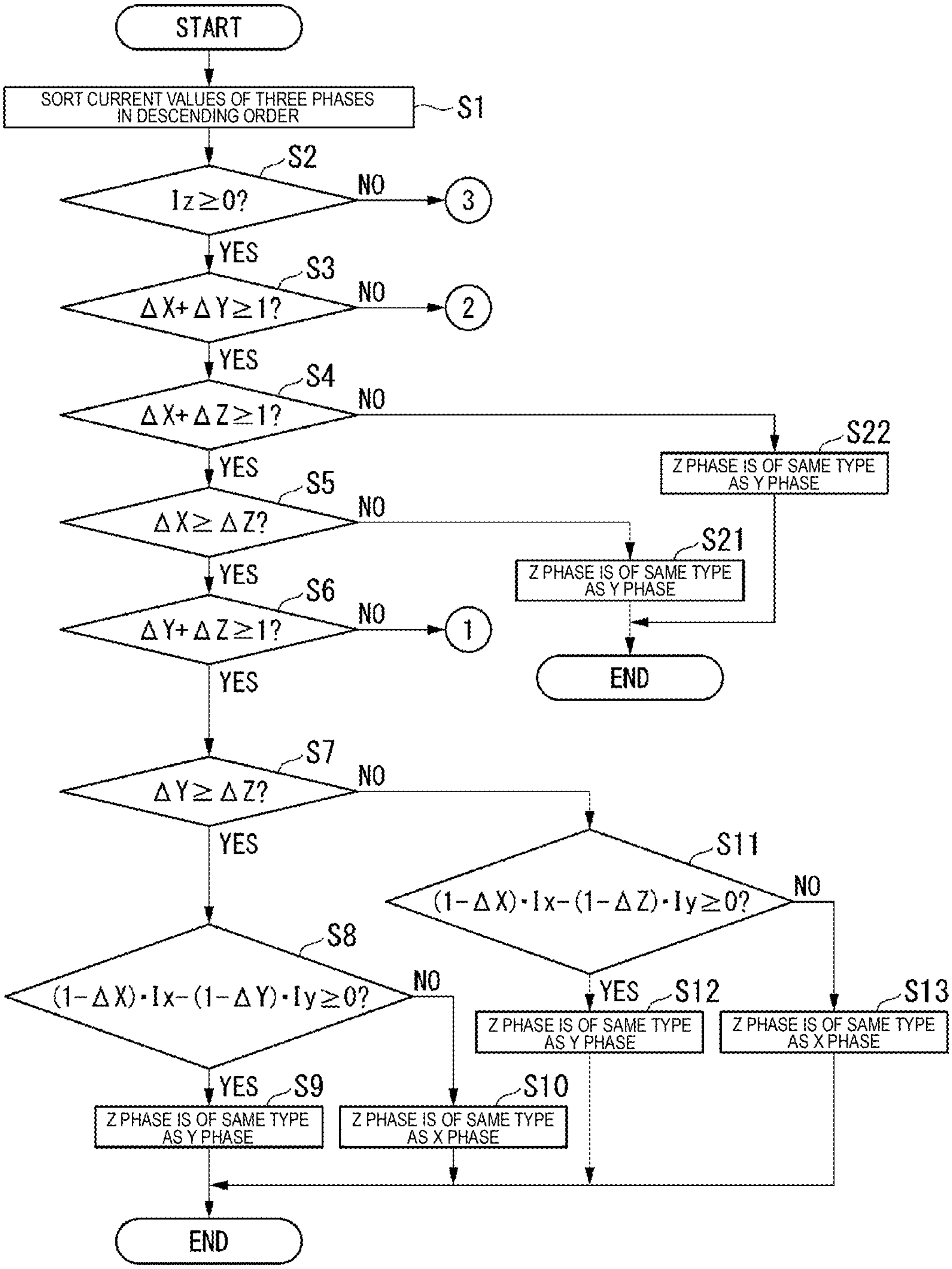
FIG. 17 is a first flowchart illustrating processing executed by a control unit.

As illustrated in FIG. 17, the control unit 13 detects the current value Iu of U-phase current, the current value Iv of V-phase current, and the current value Iw of W-phase current based on a detection result of voltage generated in each of six shunt resistors, and sorts the current values of the three phases in descending order (Step S1). Here, the U-phase current, the V-phase current, and the W-phase current are phase currents in which a direction from a high-duty switch to a low-duty switch is a positive current direction.

The control unit 13 determines a coil with a largest current value among three-phase coils as an X-phase coil based on a sorting result of the current values Iu, Iv, and Iw, and determines a largest current value among the current values Iu, Iv, and Iw as the current value Ix of the X-phase coil. The control unit 13 determines a coil with a second largest current value among three-phase coils as a Y-phase coil based on a sorting result of the current values Iu, Iv, and Iw, and determines a second largest current value among the current values Iu, Iv, and Iw as the current value Iy of the Y-phase coil. The control unit 13 determines a coil with a smallest current value among three-phase coils as a Z-phase coil based on a sorting result of the current values Iu, Iv, and Iw, and determines a smallest current value among the current values Iu, Iv, and Iw as the current value Iz of the Z-phase coil.

Subsequently, the control unit 13 determines whether or not the current value Iz of the Z-phase coil is zero or more (Step S2). In a case where the current value Iz of the Z-phase coil is zero or more (Step S2: Yes), the control unit 13 proceeds to next Step S3. In other words, in a case where the current direction of the Z-phase coil is a positive direction, the control unit 13 proceeds to Step S3.

On the other hand, in a case where the current value Iz of the Z-phase coil is less than zero (Step S2: No), the control unit 13 proceeds to Step S26 in a flowchart of FIG. 20. In other words, in a case where the current direction of the Z-phase coil is a negative direction, the control unit 13 proceeds to Step S26. Hereinafter, first, a case where the control unit 13 proceeds from Step S2 to Step S3 will be described, and a case where the control unit 13 proceeds from Step S2 to Step S26 will be described later.

When proceeding to Step S3, the control unit 13 determines whether or not Conditional expression (1) is satisfied (Step S3). Specifically, in Step S3, the control unit 13 determines whether or not Conditional expression (1) is satisfied by substituting the target voltage application time lengths ΔX and ΔY required by motor control in current one PWM cycle into Conditional expression (1).

$$\Delta X + \Delta Y \geq 1 \tag{1}$$

In a case where Conditional expression (1) is satisfied (Step S3: Yes), the control unit 13 proceeds to next Step S4. On the other hand, in a case where Conditional expression (1) is not satisfied (Step S3: No), the control unit 13 proceeds to Step S23 in a flowchart of FIG. 19. Hereinafter, first, a case where the control unit 13 proceeds from Step S3 to Step S4 will be described, and a case where the control unit 13 proceeds from Step S3 to Step S23 will be described later.

When proceeding to Step S4, the control unit 13 determines whether or not Conditional expression (2) is satisfied (Step S4). Specifically, in Step S4, the control unit 13 determines whether or not Conditional expression (2) is satisfied by substituting the target voltage application time lengths ΔX and ΔZ required by motor control in current one PWM cycle into Conditional expression (2).

$$\Delta X + \Delta Z \geq 1 \tag{2}$$

In a case where Conditional expression (2) is satisfied (Step S4: Yes), the control unit 13 proceeds to next Step S5. On the other hand, in a case where Conditional expression (2) is not satisfied (Step S4: No), the control unit 13 proceeds to Step S22 in a flowchart of FIG. 17. Hereinafter, first, a case where the control unit 13 proceeds from Step S4 to Step S5 will be described, and a case where the control unit 13 proceeds from Step S4 to Step S22 will be described later.

When proceeding to Step S5, the control unit 13 determines whether or not Conditional expression (3) is satisfied (Step S5). Specifically, in Step S5, the control unit 13 determines whether or not Conditional expression (3) is satisfied by substituting the target voltage application time lengths ΔX and ΔZ required by motor control in current one PWM cycle into Conditional expression (3).

$$\Delta X \geq \Delta Z \tag{3}$$

In a case where Conditional expression (3) is satisfied (Step S5: Yes), the control unit 13 proceeds to next Step S6. On the other hand, in a case where Conditional expression (3) is not satisfied (Step S5: No), the control unit 13 proceeds to Step S21 in a flowchart of FIG. 17. Hereinafter, first, a case where the control unit 13 proceeds from Step S5 to Step S6 will be described, and a case where the control unit 13 proceeds from Step S5 to Step S21 will be described later.

When proceeding to Step S6, the control unit 13 determines whether or not Conditional expression (4) is satisfied (Step S6). Specifically, in Step S6, the control unit 13 determines whether or not Conditional expression (4) is satisfied by substituting the target voltage application time lengths ΔY and ΔZ required by motor control in current one PWM cycle into Conditional expression (4).

$$\Delta Y + \Delta Z \geq 1 \tag{4}$$

In a case where Conditional expression (4) is satisfied (Step S6: Yes), the control unit 13 proceeds to next Step S7. On the other hand, in a case where Conditional expression (4) is not satisfied (Step S6: No), the control unit 13 proceeds to Step S14 in a flowchart of FIG. 18. Hereinafter, first, a case where the control unit 13 proceeds from Step S6 to Step S7 will be described, and a case where the control unit 13 proceeds from Step S6 to Step S14 will be described later.

When proceeding to Step S7, the control unit 13 determines whether or not Conditional expression (5) is satisfied (Step S7). Specifically, in Step S7, the control unit 13 determines whether or not Conditional expression (5) is satisfied by substituting the target voltage application time lengths ΔY and ΔZ required by motor control in current one PWM cycle into Conditional expression (5).

$$\Delta Y \geq \Delta Z \tag{5}$$

In a case where Conditional expression (5) is satisfied (Step S7: Yes), the control unit 13 proceeds to next Step S8. On the other hand, in a case where Conditional expression (5) is not satisfied (Step S7: No), the control unit 13 proceeds to Step S11 in a flowchart of FIG. 17. Hereinafter, first, a case where the control unit 13 proceeds from Step S7 to Step S8 will be described, and a case where the control unit 13 proceeds from Step S7 to Step S11 will be described later.

When proceeding to Step S8, the control unit 13 determines whether or not Conditional expression (6) is satisfied (Step S8). Specifically, in Step S8, the control unit 13 determines whether or not Conditional expression (6) is satisfied by substituting the target voltage application time lengths ΔX and ΔY required by motor control in current one PWM cycle, the current value Ix of the X-phase coil, and the current value Iy of the Y-phase coil into Conditional expression (6).

$$(1-\Delta X)\cdot Ix-(1-\Delta Y)\cdot Iy \geq 0 \tag{6}$$

In a case where Conditional expression (6) is satisfied (Step S8: Yes), the control unit 13 proceeds to next Step S9. On the other hand, in a case where Conditional expression (6) is not satisfied (Step S8: No), the control unit 13 proceeds to Step S10 in a flowchart of FIG. 17. Hereinafter, first, a case where the control unit 13 proceeds from Step S8 to Step S9 will be described, and a case where the control unit 13 proceeds from Step S8 to Step S10 will be described later.

As described above, the control unit 13 executes processing of Step S9 in a case where Conditional expressions (1) to (6) are satisfied. When proceeding to Step S9, the control unit 13 controls at least the Z-phase coil by a modulation method of the same type as that for the Y-phase coil (Step S9). Specifically, in Step S9, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S9, the control unit 13 minimizes a width of the third time region by controlling the Z-phase coil by the same modulation method as that for the Y-phase coil in one PWM cycle.

Figure 21:
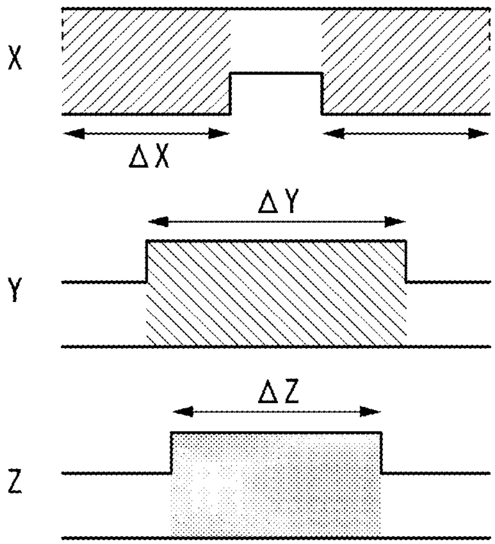
FIG. 21 illustrates an example of PWM waveforms of an X phase, a Y phase, and a Z phase generated by the control unit performing processing in Step S9 of the flowchart of FIG. 17.

FIG. 21 illustrates an example of PWM waveforms of an X phase, a Y phase, and a Z phase (waveforms of gate signals) generated by the control unit 13 performing the processing in Step S9. In the example of FIG. 21, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil.

An upper waveform of PWM waveforms of the X phase indicates a PWM waveform generated with the duty X2 of the high-duty switch connected to the X-phase coil. A lower waveform of PWM waveforms of the X phase indicates a PWM waveform generated with the duty X1 of the low duty switch connected to the X-phase coil. In the PWM waveforms of the X phase, when dead time is ignored, a hatched region is actual voltage application time of the X-phase coil (a time zone or a time region in which power supply voltage is applied between terminals of the X-phase coil).

An upper waveform of PWM waveforms of the Y phase indicates a PWM waveform generated with the duty Y2 of the high-duty switch connected to the Y-phase coil. A lower waveform of PWM waveforms of the Y phase indicates a PWM waveform generated with the duty Y1 of the low duty switch connected to the Y-phase coil. In the PWM waveforms of the Y phase, a hatched region is actual voltage application time of the Y-phase coil (a time zone or a time region in which power supply voltage is applied between terminals of the Y-phase coil).

An upper waveform of PWM waveforms of the Z phase indicates a PWM waveform generated with the duty 22 of the high-duty switch connected to the Z-phase coil. A lower waveform of PWM waveforms of the Z phase indicates a PWM waveform generated with the duty Z1 of the low duty switch connected to the Z-phase coil. In the PWM waveforms of the Z phase, a hatched region is actual voltage application time of the Z-phase coil (a time zone or a time region in which power supply voltage is applied between terminals of the Z-phase coil).

As illustrated in FIG. 21, in a case where Conditional expressions (1) to (6) are satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction and Conditional expressions (1) to (6) are satisfied, the control unit 13 can effectively suppress charge and discharge current of the smoothing capacitor 40 by performing the processing of Step S9. Note that, in this case, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil.

Returning to FIG. 17 and continuing the description, in a case where Conditional expression (6) is not satisfied (Step S8: No), the control unit 13 proceeds to Step S10 in the flowchart of FIG. 17. As described above, in a case where Conditional expressions (1) to (5) are satisfied and Condition (6) is not satisfied, the control unit 13 executes the processing of Step S10.

When proceeding to Step S10, the control unit 13 controls at least the Z-phase coil by a modulation method of the same type as that for the X-phase coil (Step S10). Specifically, in Step S10, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S10, the control unit 13 minimizes a width of the fourth time region by controlling the Z-phase coil by the same modulation method as that for the X-phase coil in one PWM cycle.

Figure 22:
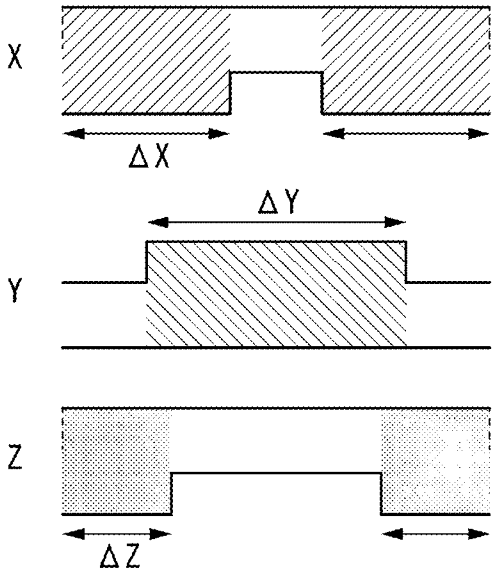
FIG. 22 illustrates an example of PWM waveforms of an X phase, a Y phase, and a Z phase generated by the control unit performing processing in Step S10 of the flowchart of FIG. 17.

FIG. 22 illustrates an example of PWM waveforms of an X phase, a Y phase, and a Z phase generated by the control unit 13 performing the processing in Step S10. In the example of FIG. 22, the X-phase coil is controlled by the high-side-on-fixed modulation method, the Y-phase coil is controlled by the low-side-on-fixed modulation method, and the Z-phase coil is controlled by the same high-side-on-fixed modulation method as the X-phase coil. Definition of a PWM waveform of each phase in FIG. 22 is the same as the definition of a PWM waveform of each phase in FIG. 21, and will be omitted from description.

As illustrated in FIG. 22, in a case where Conditional expressions (1) to (5) are satisfied and Condition (6) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the X-phase coil in one PWM cycle, so that width of the fourth time region in which voltage application time of the Z-phase coil and the first time region overlap is minimized.

As described above, in a case where the current direction of the Z-phase coil is the positive direction, Conditional expressions (1) to (5) are satisfied, and the Condition (6) is not satisfied, the control unit 13 can effectively suppress charge and discharge current of the smoothing capacitor 40 by performing the processing of Step S10. Note that, in this case, the X-phase coil may be controlled by the low-side-on-fixed modulation method, the Y-phase coil may be controlled by the high-side-on-fixed modulation method, and the Z-phase coil may be controlled by the same low-side-on-fixed modulation method as the X-phase coil.

Returning to FIG. 17 and continuing the description, in a case where Conditional expression (5) is not satisfied (Step S7: No), the control unit 13 proceeds to Step S11. When proceeding to Step S11, the control unit 13 determines whether or not Conditional expression (7) is satisfied (Step S11). Specifically, in Step S11, the control unit 13 determines whether or not Conditional expression (7) is satisfied by substituting the target voltage application time lengths ΔX and ΔZ required by motor control in current one PWM cycle, the current value Ix of the X-phase coil, and the current value Iy of the Y-phase coil into Conditional expression (7).

$$(1-\Delta X)\cdot Ix-(1-\Delta Z)\cdot Iy\geq 0 \tag{7}$$

In a case where Conditional expression (7) is satisfied (Step S11: Yes), the control unit 13 proceeds to next Step S12. On the other hand, in a case where Conditional expression (7) is not satisfied (Step S11: No), the control unit 13 proceeds to Step S13 in a flowchart of FIG. 17. Hereinafter, first, a case where the control unit 13 proceeds from Step S11 to Step S12 will be described, and a case where the control unit 13 proceeds from Step S11 to Step S13 will be described later.

As described above, in a case where Conditional expressions (1) to (4) and (7) are satisfied and Conditional expression (5) is not satisfied, the control unit 13 executes the processing of Step S12. When proceeding to Step S12, the control unit 13 controls at least the Z-phase coil by a modulation method of the same type as that for the Y-phase coil (Step S12). Specifically, in Step S12, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S12, the control unit 13 minimizes the width of the third time region by controlling the Z-phase coil by the same modulation method as that for the Y-phase coil in one PWM cycle.

Figure 23:
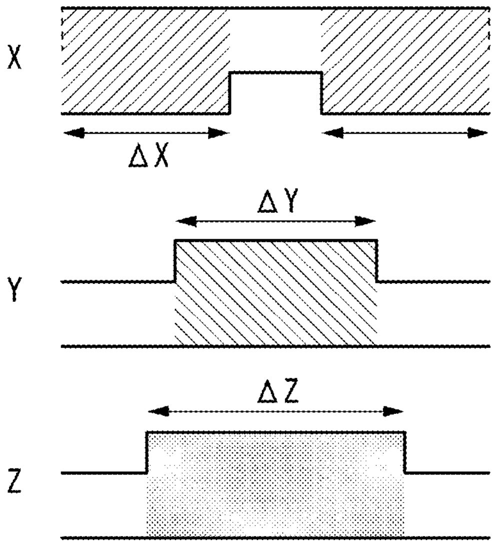
FIG. 23 illustrates an example of PWM waveforms of an X phase, a Y phase, and a Z phase generated by the control unit performing processing in Step S12 of the flowchart of FIG. 17.

FIG. 23 illustrates an example of PWM waveforms of an X phase, a Y phase, and a Z phase generated by the control unit 13 performing the processing in Step S12. In the example of FIG. 23, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil. Definition of a PWM waveform of each phase in FIG. 23 is the same as the definition of a PWM waveform of each phase in FIG. 21, and will be omitted from description.

As illustrated in FIG. 23, in a case where Conditional expressions (1) to (4) and (7) are satisfied and Conditional expression (5) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expressions (1) to (4) and (7) are satisfied, and Conditional expression (5) is not satisfied, the control unit 13 can effectively suppress charge and discharge current of the smoothing capacitor 40 by performing the processing of Step S12. Note that, in this case, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil.

Returning to FIG. 17 and continuing the description, in a case where Conditional expression (7) is not satisfied (Step S11: No), the control unit 13 proceeds to Step S13 in the flowchart of FIG. 17. As described above, in a case where Conditional expressions (1) to (4) are satisfied and Conditional expressions (5) and (7) are not satisfied, the control unit 13 executes the processing of Step S13.

When proceeding to Step S13, the control unit 13 controls at least the Z-phase coil by a modulation method of the same type as that for the X-phase coil (Step S13). Specifically, in Step S13, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S13, the control unit 13 minimizes the width of the fourth time region by controlling the Z-phase coil by the same modulation method as that for the X-phase coil in one PWM cycle.

Figure 24:
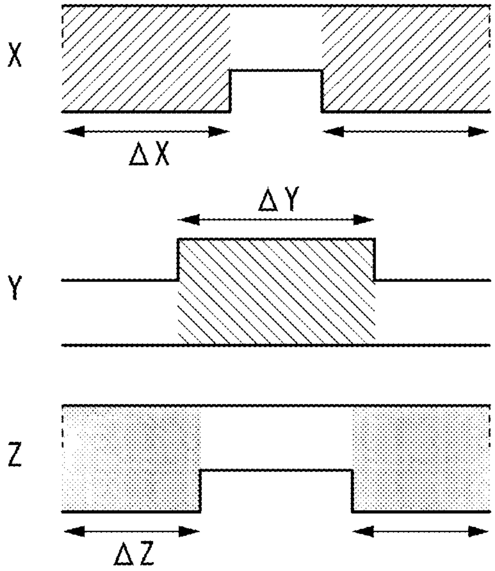
FIG. 24 illustrates an example of PWM waveforms of an X phase, a Y phase, and a Z phase generated by the control unit performing processing in Step S13 of the flowchart of FIG. 17.

FIG. 24 illustrates an example of PWM waveforms of an X phase, a Y phase, and a Z phase generated by the control unit 13 performing the processing in Step S13. In the example of FIG. 24, the X-phase coil is controlled by the high-side-on-fixed modulation method, the Y-phase coil is controlled by the low-side-on-fixed modulation method, and the Z-phase coil is controlled by the same high-side-on-fixed modulation method as the X-phase coil. Definition of a PWM waveform of each phase in FIG. 24 is the same as the definition of a PWM waveform of each phase in FIG. 21, and will be omitted from description.

As illustrated in FIG. 24, in a case where Conditional expressions (1) to (4) are satisfied and Conditional expressions (5) and (7) are not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the X-phase coil in one PWM cycle, so that width of the fourth time region in which voltage application time of the Z-phase coil and the first time region overlap is minimized.

As described above, in a case where the current direction of the Z-phase coil is the positive direction, Conditional expressions (1) to (4) are satisfied, and Conditional expressions (5) and (7) are not satisfied, the control unit 13 can effectively suppress charge and discharge current of the smoothing capacitor 40 by performing the processing of Step S13. Note that, in this case, the X-phase coil may be controlled by the low-side-on-fixed modulation method, the Y-phase coil may be controlled by the high-side-on-fixed modulation method, and the Z-phase coil may be controlled by the same low-side-on-fixed modulation method as the X-phase coil.

Figure 18:
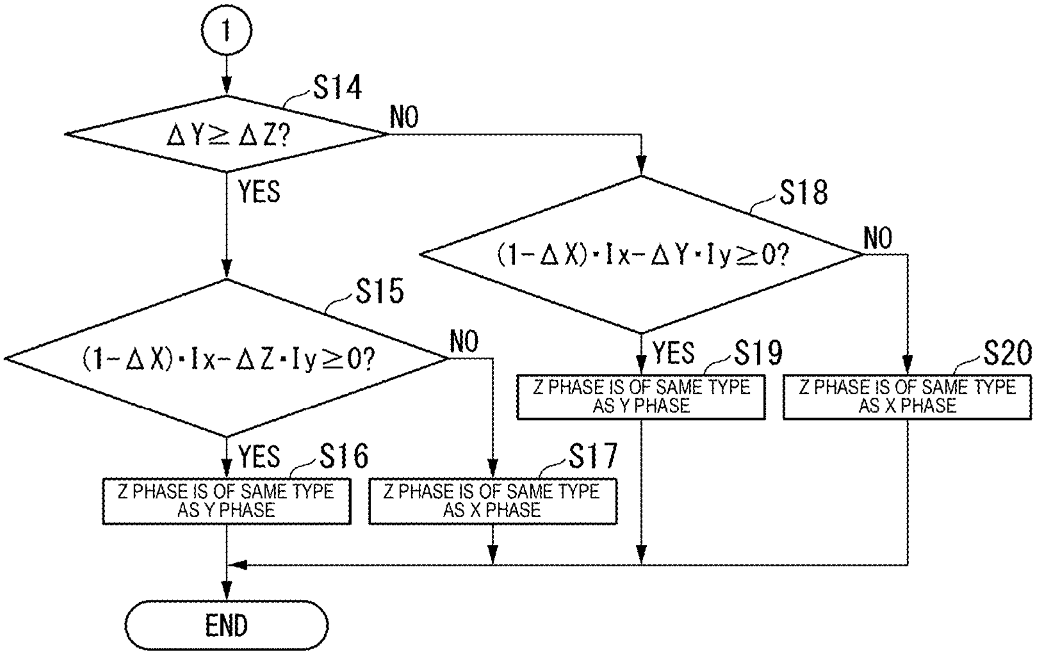
FIG. 18 is a second flowchart illustrating processing executed by the control unit.

Returning to FIG. 17 and continuing the description, in a case where Conditional expression (4) is not satisfied (Step S6: No), the control unit 13 proceeds to Step S14 in the flowchart of FIG. 18. As illustrated in FIG. 18, when proceeding to Step S14, the control unit 13 determines whether or not Conditional expression (5) is satisfied (Step S14). Specifically, in Step S14, the control unit 13 determines whether or not Conditional expression (5) is satisfied by substituting the target voltage application time lengths $\Delta Y$ and $\Delta Z$ required by motor control in current one PWM cycle into Conditional expression (5).

$$\Delta Y \geq \Delta Z \tag{5}$$

In a case where Conditional expression (5) is satisfied (Step S14: Yes), the control unit 13 proceeds to next Step S15. On the other hand, in a case where Conditional expression (5) is not satisfied (Step S14: No), the control unit 13 proceeds to Step S18 in a flowchart of FIG. 18. Hereinafter, first, a case where the control unit 13 proceeds from Step S14 to Step S15 will be described, and a case where the control unit 13 proceeds from Step S14 to Step S18 will be described later.

When proceeding to Step S15, the control unit 13 determines whether or not Conditional expression (8) is satisfied (Step S15). Specifically, in Step S15, the control unit 13 determines whether or not Conditional expression (8) is satisfied by substituting the target voltage application time lengths ΔX and ΔZ required by motor control in current one PWM cycle, the current value Ix of the X-phase coil, and the current value Iy of the Y-phase coil into Conditional expression (8).

$$(1-\Delta X)\cdot Ix-\Delta Z\cdot Iy\geq 0 \tag{8}$$

In a case where Conditional expression (8) is satisfied (Step S15: Yes), the control unit 13 proceeds to next Step S16. On the other hand, in a case where Conditional expression (8) is not satisfied (Step S15: No), the control unit 13 proceeds to Step S17 in a flowchart of FIG. 18. Hereinafter, first, a case where the control unit 13 proceeds from Step S15 to Step S16 will be described, and a case where the control unit 13 proceeds from Step S15 to Step S17 will be described later.

As described above, in a case where Conditional expressions (1) to (3), (5), and (8) are satisfied and Conditional expression (4) is not satisfied, the control unit 13 executes the processing of Step S16. When proceeding to Step S16, the control unit 13 controls at least the Z-phase coil by a modulation method of the same type as that for the Y-phase coil (Step S16). Specifically, in Step S16, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S16, the control unit 13 minimizes the width of the third time region by controlling the Z-phase coil by the same modulation method as that for the Y-phase coil in one PWM cycle.

Figure 25:
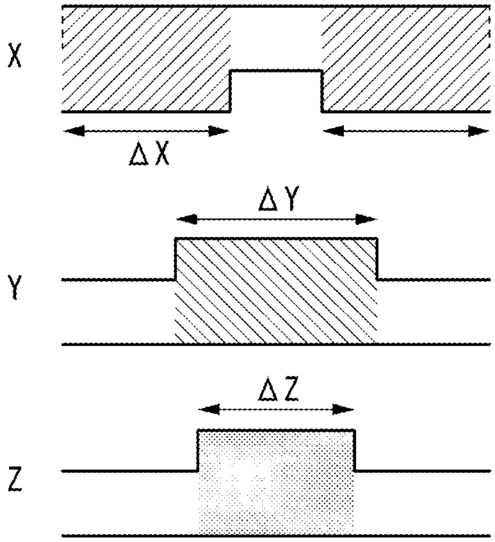
FIG. 25 illustrates an example of PWM waveforms of an X phase, a Y phase, and a Z phase generated by the control unit performing processing in Step S16 of the flowchart of FIG. 18.

FIG. 25 illustrates an example of PWM waveforms of an X phase, a Y phase, and a Z phase generated by the control unit 13 performing the processing in Step S16. In the example of FIG. 25, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil. Definition of a PWM waveform of each phase in FIG. 25 is the same as the definition of a PWM waveform of each phase in FIG. 21, and will be omitted from description.

As illustrated in FIG. 25, in a case where Conditional expressions (1) to (3), (5), and (8) are satisfied and Conditional expression (4) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expressions (1) to (3), (5), and (8) are satisfied, and Conditional expression (4) is not satisfied, the control unit 13 can effectively suppress charge and discharge current of the smoothing capacitor 40 by performing the processing of Step S16. Note that, in this case, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil.

Returning to FIG. 18 and continuing the description, in a case where Conditional expression (8) is not satisfied (Step S15: No), the control unit 13 proceeds to Step S17. As described above, in a case where Conditional expressions (1) to (3) and (5) are satisfied and Conditional expressions (4) and (8) are not satisfied, the control unit 13 executes the processing of Step S17.

When proceeding to Step S17, the control unit 13 controls at least the Z-phase coil by a modulation method of the same type as that for the X-phase coil (Step S17). Specifically, in Step S17, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S17, the control unit 13 minimizes the width of the fourth time region by controlling the Z-phase coil by the same modulation method as that for the X-phase coil or controlling the Z-phase coil by the both-side-switching modulation method in one PWM cycle.

Figure 26:
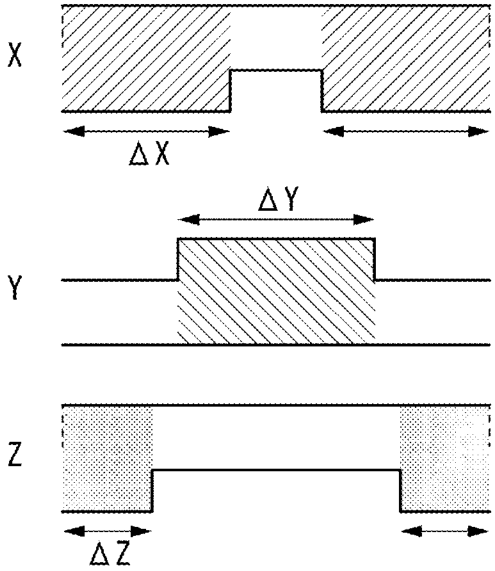
FIG. 26 illustrates an example of PWM waveforms of an X phase, a Y phase, and a Z phase generated by the control unit performing processing in Step S17 of the flowchart of FIG. 18.

FIG. 26 illustrates an example of PWM waveforms of an X phase, a Y phase, and a Z phase generated by the control unit 13 performing the processing in Step S17. In the example of FIG. 26, the X-phase coil is controlled by the high-side-on-fixed modulation method, the Y-phase coil is controlled by the low-side-on-fixed modulation method, and the Z-phase coil is controlled by the same high-side-on-fixed modulation method as the X-phase coil. Definition of a PWM waveform of each phase in FIG. 26 is the same as the definition of a PWM waveform of each phase in FIG. 21, and will be omitted from description.

As illustrated in FIG. 26, in a case where Conditional expressions (1) to (3) and (5) are satisfied and Conditional expressions (4) and (8) are not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the X-phase coil in one PWM cycle, so that width of the fourth time region in which voltage application time of the Z-phase coil and the first time region overlap is minimized.

As described above, in a case where the current direction of the Z-phase coil is the positive direction, Conditional expressions (1) to (3) and (5) are satisfied, and Conditional expressions (4) and (8) are not satisfied, the control unit 13 can effectively suppress charge and discharge current of the smoothing capacitor 40 by performing the processing of Step S17. Note that, in this case, if a condition of $Z1\geq Y2$ is satisfied, the Z-phase coil may be controlled by the both-side-switching modulation method. As described above, also in a case where the Z-phase coil is controlled by the both-side-switching modulation method, width of the fourth time region is minimized.

Further, in a case where Conditional expressions (1) to (3) and (5) are satisfied and Conditional expressions (4) and (8) are not satisfied, the X-phase coil may be controlled by the low-side-on-fixed modulation method, the Y-phase coil may be controlled by the high-side-on-fixed modulation method, and the Z-phase coil may be controlled by the same low-side-on-fixed modulation method as the X-phase coil. In this case, if a condition of $Z2 \leq Y1$ is satisfied, the Z-phase coil may be controlled by the both-side-switching modulation method. Note that controlling the Z-phase coil by the same high-side-on-fixed modulation method or low-side-on-fixed modulation method as the X-phase coil is advantageous in that a switching loss can be reduced.

Returning to FIG. 18 and continuing the description, in a case where Conditional expression (5) is not satisfied (Step S14: No), the control unit 13 proceeds to Step S18. When proceeding to Step S18, the control unit 13 determines whether or not Conditional expression (9) is satisfied (Step S18). Specifically, in Step S18, the control unit 13 determines whether or not Conditional expression (9) is satisfied by substituting the target voltage application time lengths ΔX and ΔY required by motor control in current one PWM cycle, the current value Ix of the X-phase coil, and the current value Iy of the Y-phase coil into Conditional expression (9).

$$(1-\Delta x)\cdot Ix - \Delta Y\cdot Iy \geq 0 \quad (9)$$

In a case where Conditional expression (9) is satisfied (Step S18: Yes), the control unit 13 proceeds to next Step S19. On the other hand, in a case where Conditional expression (9) is not satisfied (Step S18: No), the control unit 13 proceeds to Step S20 in a flowchart of FIG. 18. Hereinafter, first, a case where the control unit 13 proceeds from Step S18 to Step S19 will be described, and a case where the control unit 13 proceeds from Step S18 to Step S20 will be described later.

As described above, in a case where Conditional expressions (1) to (3) and (9) are satisfied and Conditional expressions (4) and (5) are not satisfied, the control unit 13 executes the processing of Step S19. When proceeding to Step S19, the control unit 13 controls at least the Z-phase coil by a modulation method of the same type as that for the Y-phase coil (Step S19). Specifically, in Step S19, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S19, the control unit 13 minimizes the width of the third time region by controlling the Z-phase coil by the same modulation method as that for the Y-phase coil in one PWM cycle.

Figure 27:
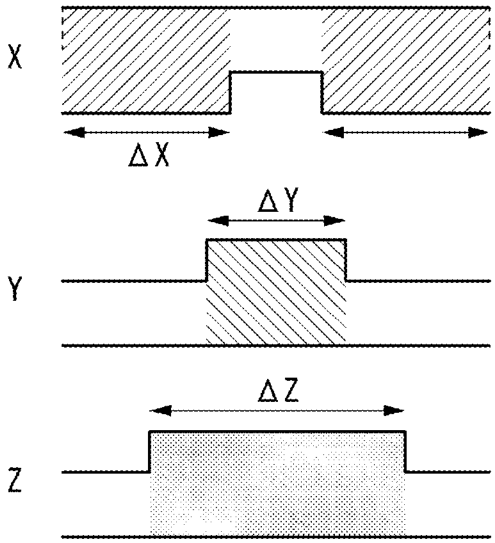
FIG. 27 illustrates an example of PWM waveforms of an X phase, a Y phase, and a Z phase generated by the control unit performing processing in Step S19 of the flowchart of FIG. 18.

FIG. 27 illustrates an example of PWM waveforms of an X phase, a Y phase, and a Z phase generated by the control unit 13 performing the processing in Step S19. In the example of FIG. 27, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil. Definition of a PWM waveform of each phase in FIG. 27 is the same as the definition of a PWM waveform of each phase in FIG. 21, and will be omitted from description.

As illustrated in FIG. 27, in a case where Conditional expressions (1) to (3) and (9) are satisfied and Conditional expressions (4) and (5) are not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expressions (1) to (3) and (9) are satisfied, and Conditional expressions (4) and (5) are not satisfied, the control unit 13 can effectively suppress charge and discharge current of the smoothing capacitor 40 by performing the processing of Step S19. Note that, in this case, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil.

Returning to FIG. 18 and continuing the description, in a case where Conditional expression (9) is not satisfied (Step S18: No), the control unit 13 proceeds to Step S20. As described above, in a case where Conditional expressions (1) to (3) are satisfied and Conditional expressions (4), (5), and (9) are not satisfied, the control unit 13 executes the processing of Step S20.

When proceeding to Step S20, the control unit 13 controls at least the Z-phase coil by a modulation method of the same type as that for the X-phase coil (Step S20). Specifically, in Step S20, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S20, the control unit 13 minimizes the width of the fourth time region by controlling the Z-phase coil by the same modulation method as that for the X-phase coil or controlling the Z-phase coil by the both-side-switching modulation method in one PWM cycle.

Figure 28:
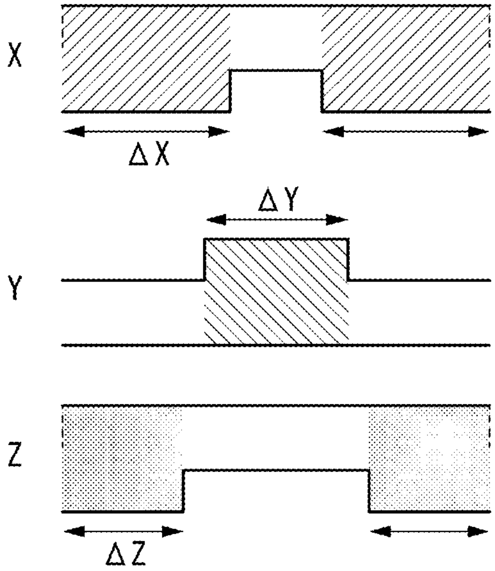
FIG. 28 illustrates an example of PWM waveforms of an X phase, a Y phase, and a Z phase generated by the control unit performing processing in Step S20 of the flowchart of FIG. 18.

FIG. 28 illustrates an example of PWM waveforms of an X phase, a Y phase, and a Z phase generated by the control unit 13 performing the processing in Step S20. In the example of FIG. 28, the X-phase coil is controlled by the high-side-on-fixed modulation method, the Y-phase coil is controlled by the low-side-on-fixed modulation method, and the Z-phase coil is controlled by the same high-side-on-fixed modulation method as the X-phase coil. Definition of a PWM waveform of each phase in FIG. 28 is the same as the definition of a PWM waveform of each phase in FIG. 21, and will be omitted from description.

As illustrated in FIG. 28, in a case where Conditional expressions (1) to (3) are satisfied and Conditional expressions (4), (5), and (9) are not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the X-phase coil in one PWM cycle, so that width of the fourth time region in which voltage application time of the Z-phase coil and the first time region overlap is minimized.

As described above, in a case where the current direction of the Z-phase coil is the positive direction, Conditional expressions (1) to (3) are satisfied, and Conditional expressions (4), (5), and (9) are not satisfied, the control unit 13 can effectively suppress charge and discharge current of the smoothing capacitor 40 by performing the processing of Step S20. Note that, in this case, if a condition of Z1≥Y2 is satisfied, the Z-phase coil may be controlled by the both-side-switching modulation method. As described above, also in a case where the Z-phase coil is controlled by the both-side-switching modulation method, width of the fourth time region is minimized.

Further, in a case where Conditional expressions (1) to (3) are satisfied and Conditional expressions (4), (5), and (9) are not satisfied, the X-phase coil may be controlled by the low-side-on-fixed modulation method, the Y-phase coil may be controlled by the high-side-on-fixed modulation method, and the Z-phase coil may be controlled by the same low-side-on-fixed modulation method as the X-phase coil. In this case, if a condition of 22≤Y1 is satisfied, the Z-phase coil may be controlled by the both-side-switching modulation method. Note that controlling the Z-phase coil by the same high-side-on-fixed modulation method or low-side-on-fixed modulation method as the X-phase coil is advantageous in that a switching loss can be reduced.

Returning to FIG. 17 and continuing the description, in a case where Conditional expression (3) is not satisfied (Step S5: No), the control unit 13 proceeds to Step S21. As described above, in a case where Conditional expressions (1) and (2) are satisfied and Conditional expression (3) is not satisfied, the control unit 13 executes the processing of Step S21.

When proceeding to Step S21, the control unit 13 controls at least the Z-phase coil by a modulation method of the same type as that for the Y-phase coil (Step S21). Specifically, in Step S21, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S21, the control unit 13 minimizes the width of the third time region by controlling the Z-phase coil by the same modulation method as that for the Y-phase coil in one PWM cycle.

Figure 29:
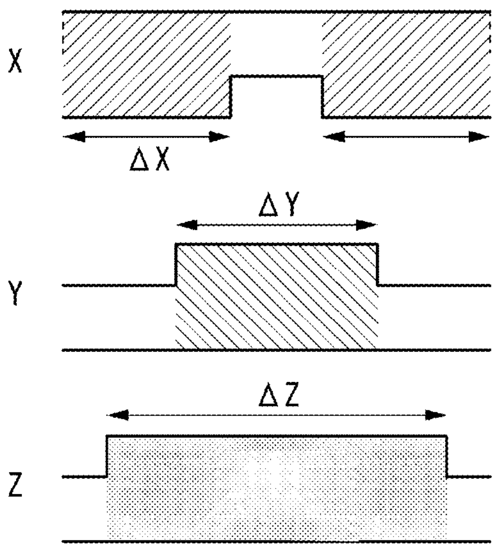
FIG. 29 illustrates an example of PWM waveforms of an X phase, a Y phase, and a Z phase generated by the control unit performing processing in Step S21 of the flowchart of FIG. 17.

FIG. 29 illustrates an example of PWM waveforms of an X phase, a Y phase, and a Z phase generated by the control unit 13 performing the processing in Step S21. In the example of FIG. 29, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil. Definition of a PWM waveform of each phase in FIG. 29 is the same as the definition of a PWM waveform of each phase in FIG. 21, and will be omitted from description.

As illustrated in FIG. 29, in a case where Conditional expressions (1) and (2) are satisfied and Conditional expression (3) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expressions (1) and (2) are satisfied, and Conditional expression (3) is not satisfied, the control unit 13 can effectively suppress charge and discharge current of the smoothing capacitor 40 by performing the processing of Step S21. Note that, in this case, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil.

Returning to FIG. 17 and continuing the description, in a case where Conditional expression (2) is not satisfied (Step S4: No), the control unit 13 proceeds to Step S22. As described above, in a case where Conditional expression (1) is satisfied and Conditional expression (2) is not satisfied, the control unit 13 executes the processing of Step S22.

When proceeding to Step S22, the control unit 13 controls at least the Z-phase coil by a modulation method of the same type as that for the Y-phase coil (Step S22). Specifically, in Step S22, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S22, the control unit 13 minimizes the width of the third time region by controlling the Z-phase coil by the same modulation method as that for the Y-phase coil or controlling the Z-phase coil by the both-side-switching modulation method in one PWM cycle.

Figure 30:
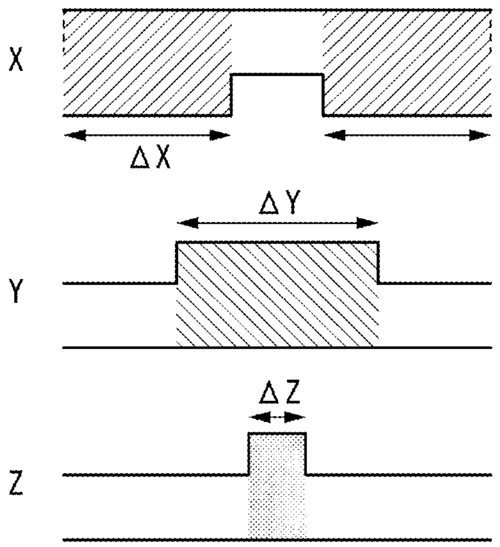
FIG. 30 illustrates an example of PWM waveforms of an X phase, a Y phase, and a Z phase generated by the control unit performing processing in Step S22 of the flowchart of FIG. 17.

FIG. 30 illustrates an example of PWM waveforms of an X phase, a Y phase, and a Z phase generated by the control unit 13 performing the processing in Step S22. In the example of FIG. 30, the X-phase coil is controlled by the high-side-on-fixed modulation method, the Y-phase coil is controlled by the low-side-on-fixed modulation method, and the Z-phase coil is controlled by the same low-side-on-fixed modulation method as the Y-phase coil. Definition of a PWM waveform of each phase in FIG. 30 is the same as the definition of a PWM waveform of each phase in FIG. 21, and will be omitted from description.

As illustrated in FIG. 30, in a case where Conditional expression (1) is satisfied and Conditional expression (2) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the same modulation method as that for the Y-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expression (1) is satisfied, and Conditional expression (2) is not satisfied, the control unit 13 can effectively suppress charge and discharge current of the smoothing capacitor 40 by performing the processing of Step S22. Note that, in this case, if a condition of X1≥Z2 is satisfied, the Z-phase coil may be controlled by the both-side-switching modulation method. As described above, also in a case where the Z-phase coil is controlled by the both-side-switching modulation method, width of the third time region is minimized.

Further, in a case where Conditional expression (1) is satisfied and Conditional expression (2) is not satisfied, the X-phase coil may be controlled by the low-side-on-fixed modulation method, the Y-phase coil may be controlled by the high-side-on-fixed modulation method, and the Z-phase coil may be controlled by the same high-side-on-fixed modulation method as the Y-phase coil. In this case, if a condition of $X2 \leq Z1$ is satisfied, the Z-phase coil may be controlled by the both-side-switching modulation method. Note that controlling the Z-phase coil by the same high-side-on-fixed modulation method or low-side-on-fixed modulation method as the Y-phase coil is advantageous in that a switching loss can be reduced.

Figure 19:
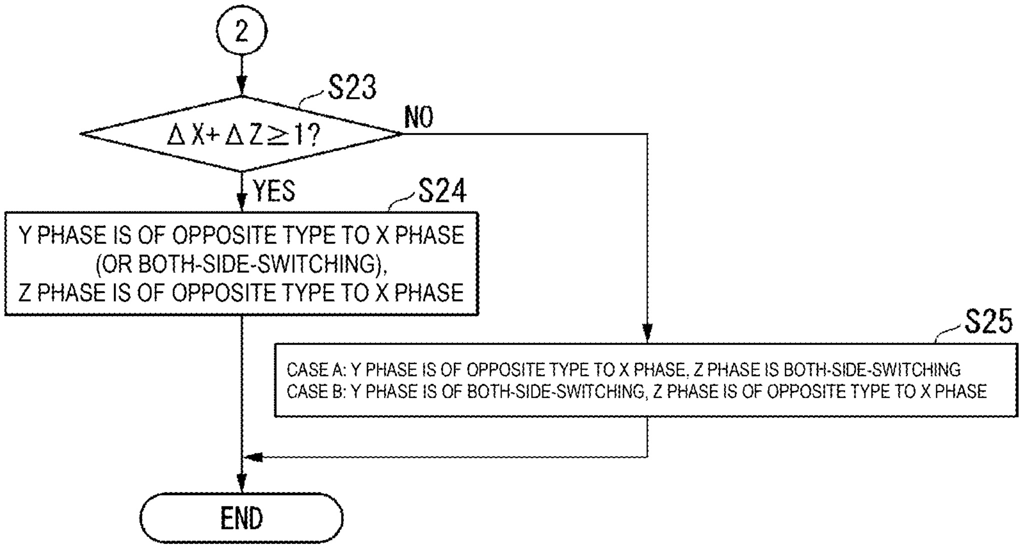
FIG. 19 is a third flowchart illustrating processing executed by the control unit.

Returning to FIG. 17 and continuing the description, in a case where Conditional expression (1) is not satisfied (Step S3: No), the control unit 13 proceeds to Step S23 in the flowchart of FIG. 19. As illustrated in FIG. 19, when proceeding to Step S23, the control unit 13 determines whether or not Conditional expression (2) is satisfied (Step S23). Specifically, in Step S23, the control unit 13 determines whether or not Conditional expression (2) is satisfied by substituting the target voltage application time lengths $\Delta X$ and $\Delta Z$ required by motor control in current one PWM cycle into Conditional expression (2).

$$\Delta X + \Delta Z \geq 1 \qquad (2)$$

In a case where Conditional expression (2) is satisfied (Step S23: Yes), the control unit 13 proceeds to next Step S24. On the other hand, in a case where Conditional expression (2) is not satisfied (Step S23: No), the control unit 13 proceeds to Step S25 in a flowchart of FIG. 19. Hereinafter, first, a case where the control unit 13 proceeds from Step S23 to Step S24 will be described, and a case where the control unit 13 proceeds from Step S23 to Step S25 will be described later.

As described above, in a case where Conditional expression (1) is not satisfied and Conditional expression (2) is satisfied, the control unit 13 executes the processing of Step S24. When proceeding to Step S24, the control unit 13 controls the Y-phase coil by a modulation method of an opposite type to that for the X-phase coil or the both-side-switching modulation method, and controls the Z-phase coil by a modulation method of an opposite type to that for the X-phase coil (Step S24).

Specifically, in Step S24, the control unit 13 minimizes the width of the first time region by controlling one of the X-phase coil and the Y-phase coil by the high-side-on-fixed modulation method and the other by the low-side-on-fixed modulation method in one PWM cycle. Alternatively, the control unit 13 minimizes the width of the first time region by controlling the X-phase coil by the high-side-on-fixed modulation method or the low-side-on-fixed modulation method and controlling the Y-phase coil by the both-side-switching modulation method in one PWM cycle. Further, in Step S24, the control unit 13 minimizes the width of the third time region by controlling the Z-phase coil by a modulation method of an opposite type to that for the X-phase coil in one PWM cycle.

Figure 31:
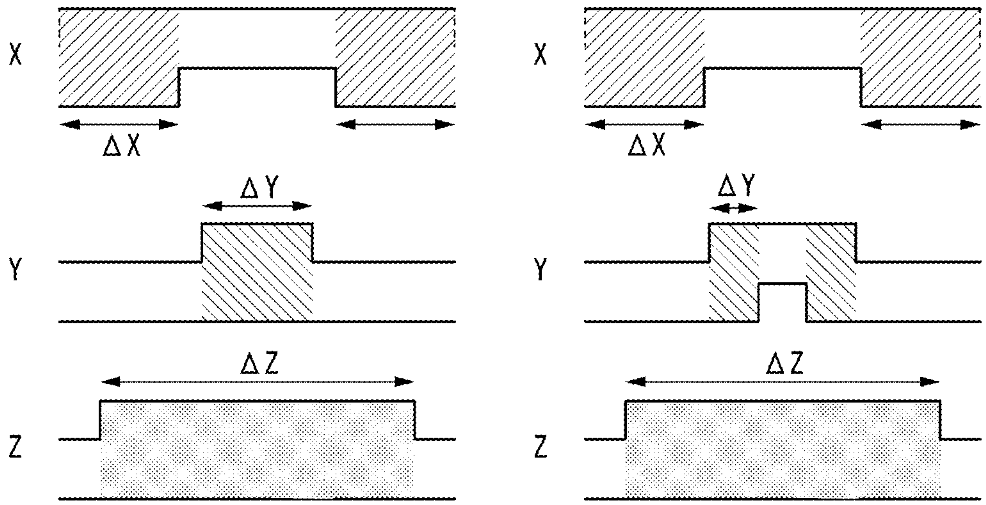
FIG. 31 illustrates an example of PWM waveforms of an X phase, a Y phase, and a Z phase generated by the control unit performing processing in Step S24 of the flowchart of FIG. 19.

FIG. 31 illustrates an example of PWM waveforms of an X phase, a Y phase, and a Z phase generated by the control unit 13 performing the processing in Step S24. Between two PWM waveforms illustrated in FIG. 31, a PWM waveform on the left side is an example of a PWM waveform in a case where the X-phase coil is controlled by the high-side-on-fixed modulation method, and the Y-phase coil and the Z-phase coil are controlled by the low-side-on-fixed modulation method. Between the two PWM waveforms illustrated in FIG. 31, a PWM waveform on the right side is an example of a PWM waveform in a case where the X-phase coil is controlled by the high-side-on-fixed modulation method, the Y-phase coil is controlled by the both-side-switching modulation method, and the Z-phase coil is controlled by the low-side-on-fixed modulation method. In this case, a condition of $X1 \geq Y2$ only needs to be satisfied. Definition of a PWM waveform of each phase in FIG. 31 is the same as the definition of a PWM waveform of each phase in FIG. 21, and will be omitted from description.

As illustrated in FIG. 31, in a case where Conditional expression (1) is not satisfied and Conditional expression (2) is satisfied, the Y-phase coil is controlled by a modulation method of an opposite type to that for the X-phase coil or by the both-side-switching modulation method in one PWM cycle, so that width of the first time region in which voltage application time of the X-phase coil and voltage application time of the Y-phase coil overlap is minimized. In this case, width of the first time region is zero. Further, in this case, the Z-phase coil is controlled by a modulation method of an opposite type to that for the X-phase coil in one PWM cycle, so that width of the third time region in which voltage application time of the Z-phase coil and voltage application time of the X-phase coil overlap is minimized.

As described above, in a case where the current direction of the Z-phase coil is the positive direction, Conditional expression (1) is not satisfied, and Conditional expression (2) is satisfied, the control unit 13 can effectively suppress charge and discharge current of the smoothing capacitor 40 by performing the processing of Step S24. Note that, in this case, the X-phase coil may be controlled by the low-side-on-fixed modulation method, the Y-phase coil may be controlled by the high-side-on-fixed modulation method or the both-side-switching modulation method, and the Z-phase coil may be controlled by the high-side-on-fixed modulation method. In this case, a condition of $X2 \leq Y1$ only needs to be satisfied.

Returning to FIG. 19 and continuing the description, in a case where Conditional expression (2) is not satisfied (Step S23: No), the control unit 13 proceeds to Step S25. As described above, the control unit 13 executes processing of Step S25 in a case where Conditional expressions (1) and (2) are not satisfied.

When proceeding to Step S25, the control unit 13 controls the Y-phase coil by a modulation method of an opposite type to that for the X-phase coil, and controls the Z-phase coil by the both-side-switching modulation method (Step S25: Case A). Alternatively, when proceeding to Step S25, the control unit 13 controls the Y-phase coil by the both-side-switching modulation method, and controls the Z-phase coil by a modulation method of an opposite type to that for the X-phase coil (Step S25: Case B).

Specifically, in Case A of Step S25, the control unit 13 sets width of the first time region to zero by controlling one of the X-phase coil and the Y-phase coil by the high-side-on-fixed modulation method and the other by the low-side-on-fixed modulation method in one PWM cycle. Further, in Case A of Step S25, the control unit 13 sets the width of the third time region to zero and minimizes a width of the fifth time region in which voltage application time of the Z-phase coil and voltage application time of the Y-phase coil overlap by controlling the Z-phase coil by the both-side-switching modulation method in one PWM cycle.

In Case B of Step S25, the control unit 13 sets width of the first time region to zero by controlling the X-phase coil by the high-side-on-fixed modulation method or the low-side-on-fixed modulation method and controlling the Y-phase coil by the both-side-switching modulation method in one PWM cycle. Further, in Case B of Step S25, the control unit 13 sets the width of the third time region to zero and minimizes the width of the fifth time region in which voltage application time of the Z-phase coil and voltage application time of the Y-phase coil overlap by controlling the Z-phase coil by a modulation method of an opposite type to that for the X-phase coil in one PWM cycle.

Figure 32:
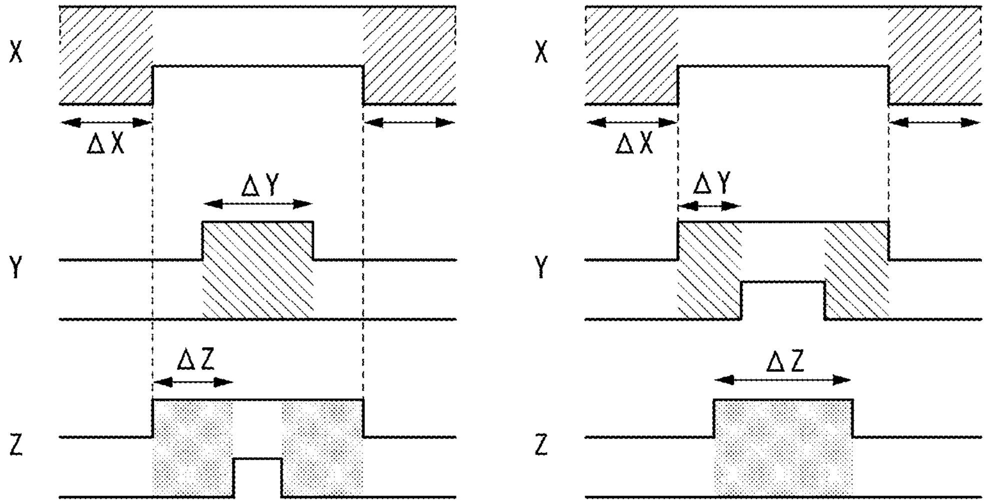
FIG. 32 illustrates an example of PWM waveforms of an X phase, a Y phase, and a Z phase generated by the control unit performing processing in Step S25 of the flowchart of FIG. 19.

FIG. 32 illustrates an example of PWM waveforms of an X phase, a Y phase, and a Z phase generated by the control unit 13 performing the processing in Step S25. Between two PWM waveforms illustrated in FIG. 32, a PWM waveform on the left side is an example of a PWM waveform in Case A where the X-phase coil is controlled by the high-side-on-fixed modulation method, the Y-phase coil is controlled by the low-side-on-fixed modulation method, and the Z-phase coil is controlled by the both-side-switching modulation method. In this case, it is preferable that X1=Z2. Between the two PWM waveforms illustrated in FIG. 32, a PWM waveform on the right side is an example of Case B where the X-phase coil is controlled by the high-side-on-fixed modulation method, the Y-phase coil is controlled by the both-side-switching modulation method, and the Z-phase coil is controlled by the low-side-on-fixed modulation method. In this case, it is preferable that X1=Y2. Definition of a PWM waveform of each phase in FIG. 32 is the same as the definition of a PWM waveform of each phase in FIG. 21, and will be omitted from description.

As indicated by the PWM waveform in Case A in FIG. 32, in a case where Conditional expressions (1) and (2) are not satisfied, the Y-phase coil is controlled by a modulation method opposite to that for the X-phase coil and the Z-phase coil is controlled by the both-side-switching modulation method in one PWM cycle, so that width of the first time region and width of the third time region become zero, and width of the fifth time region is minimized. Further, as indicated by the PWM waveform in Case B in FIG. 32, in a case where Conditional expressions (1) and (2) are not satisfied, the Y-phase coil is controlled by the both-side-switching modulation method and the Z-phase coil is controlled by a modulation method opposite to that for the X-phase coil in one PWM cycle, so that width of the first time region and width of the third time region become zero, and width of the fifth time region is minimized.

As described above, in a case where the current direction of the Z-phase coil is the positive direction, and Conditional expressions (1) and (2) are not satisfied, the control unit 13 can effectively suppress charge and discharge current of the smoothing capacitor 40 by performing the processing of Step S25. Note that, in Case A, the X-phase coil may be controlled by the low-side-on-fixed modulation method, the Y-phase coil may be controlled by the high-side-on-fixed modulation method, and the Z-phase coil may be controlled by the both-side-switching modulation method. In this case, it is preferable that X2=Z1. Further, in Case B, the X-phase coil may be controlled by the low-side-on-fixed modulation method, the Y-phase coil may be controlled by the both-side-switching modulation method, and the Z-phase coil may be controlled by the high-side-on-fixed modulation method. In this case, it is preferable that X2=Y1.

Returning to FIG. 17 and continuing the description, in a case where the current value Iz of the Z-phase coil is less than zero (Step S2: No), the control unit 13 proceeds to Step S26 in a flowchart of FIG. 20. In other words, in a case where the current direction of the Z-phase coil is a negative direction, the control unit 13 proceeds to Step S26.

Figure 20:
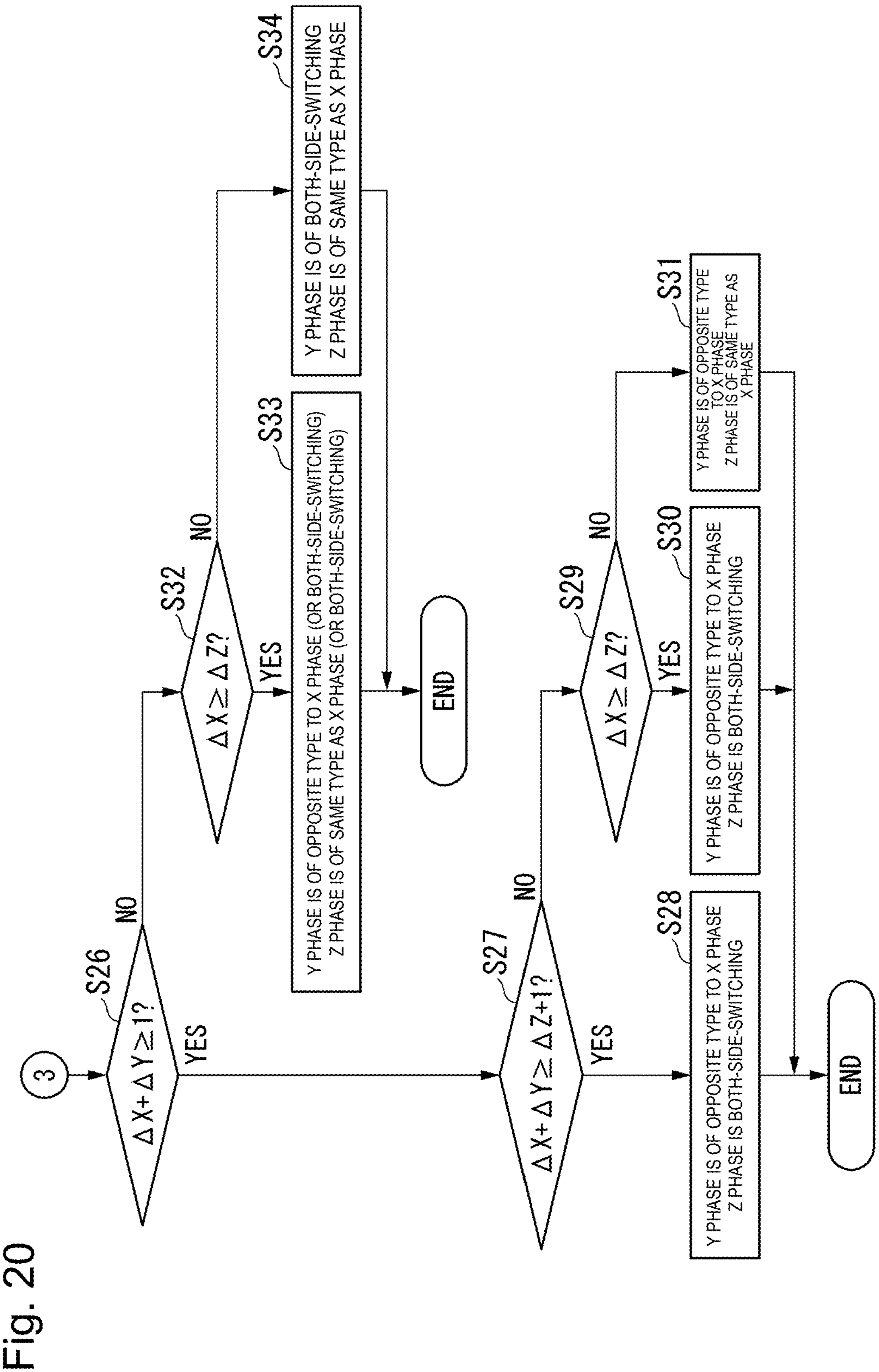
FIG. 20 is a fourth flowchart illustrating processing executed by the control unit.

As illustrated in FIG. 20, when proceeding to Step S26, the control unit 13 determines whether or not Conditional expression (1) is satisfied (Step S26). Specifically, in Step S26, the control unit 13 determines whether or not Conditional expression (1) is satisfied by substituting the target voltage application time lengths ΔX and ΔY required by motor control in current one PWM cycle into Conditional expression (1).

$$\Delta X + \Delta Y \geq 1 \tag{1}$$

In a case where Conditional expression (1) is satisfied (Step S26: Yes), the control unit 13 proceeds to next Step S27. On the other hand, in a case where Conditional expression (1) is not satisfied (Step S26: No), the control unit 13 proceeds to Step S32 in a flowchart of FIG. 20. Hereinafter, first, a case where the control unit 13 proceeds from Step S26 to Step S27 will be described, and a case where the control unit 13 proceeds from Step S26 to Step S32 will be described later.

When proceeding to Step S27, the control unit 13 determines whether or not Conditional expression (10) is satisfied (Step S27). Specifically, in Step S27, the control unit 13 determines whether or not Conditional expression (10) is satisfied by substituting the target voltage application time lengths ΔX, ΔY, and ΔZ required by motor control in current one PWM cycle into Conditional expression (10).

$$\Delta X + \Delta Y \geq \Delta Z + 1 \tag{10}$$

In a case where Conditional expression (10) is satisfied (Step S27: Yes), the control unit 13 proceeds to next Step S28. On the other hand, in a case where Conditional expression (10) is not satisfied (Step S27: No), the control unit 13 proceeds to Step S29 in a flowchart of FIG. 20. Hereinafter, first, a case where the control unit 13 proceeds from Step S27 to Step S28 will be described, and a case where the control unit 13 proceeds from Step S27 to Step S29 will be described later.

As described above, in a case where the current direction of the Z-phase coil is the negative direction, and in a case where Conditional expressions (1) and (10) are satisfied, the control unit 13 executes the processing of Step S28. When proceeding to Step S28, the control unit 13 controls the Y-phase coil by a modulation method of an opposite type to that for the X-phase coil, and controls the Z-phase coil by the both-side-switching modulation method (Step S28).

Specifically, in Step S28, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S24, the control unit 13 maximizes width of the fourth time region by controlling the Z-phase coil by the both-side-switching modulation method in one PWM cycle.

Figure 33:
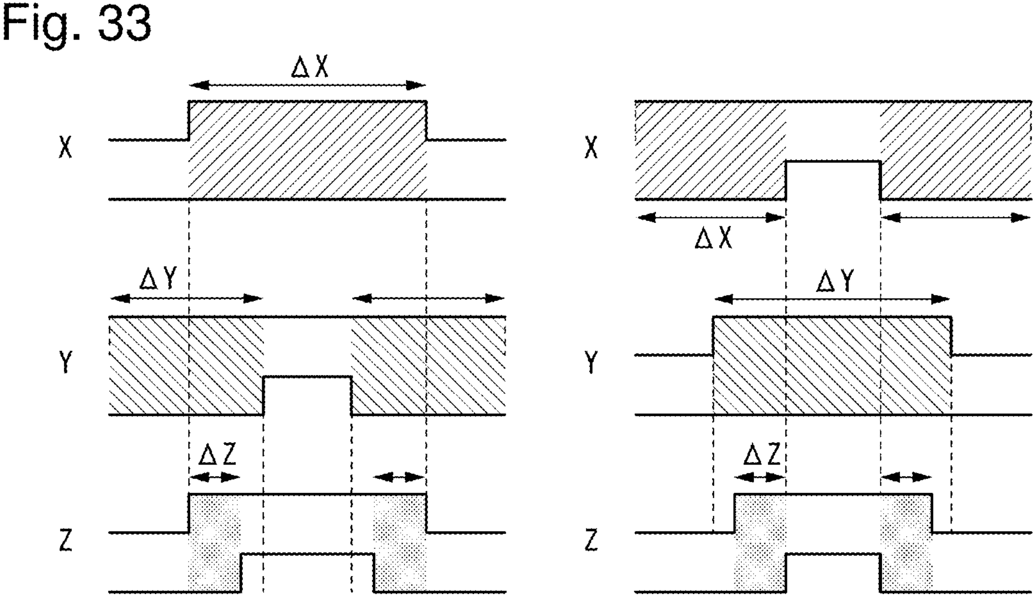
FIG. 33 illustrates an example of PWM waveforms of an X phase, a Y phase, and a Z phase generated by the control unit performing processing in Step S28 of the flowchart of FIG. 20.

FIG. 33 illustrates an example of PWM waveforms of an X phase, a Y phase, and a Z phase generated by the control unit 13 performing the processing in Step S28. Between two PWM waveforms illustrated in FIG. 33, a PWM waveform on the left side is an example of a PWM waveform in a case where the X-phase coil is controlled by the low-side-on-fixed modulation method, the Y-phase coil is controlled by the high-side-on-fixed modulation method, and the Z-phase coil is controlled by the both-side-switching modulation method. In this case (case where X1=0 and Y2=1), X2≥Z2 and Z1≥Y1. By setting X2≥Z2 and Z1≥Y1, voltage application time of the Z phase is included in the first time region, and width of the fourth time region is maximized. For example, Z2=X2 and Z1=X2−ΔZ.

Between the two PWM waveforms illustrated in FIG. 33, a PWM waveform on the right side is an example of a PWM waveform in a case where the X-phase coil is controlled by the high-side-on-fixed modulation method, the Y-phase coil is controlled by the low-side-on-fixed modulation method, and the Z-phase coil is controlled by the both-side-switching modulation method. In this case (case where X2=1 and Y1=0), X1≤21 and 22≤Y2. By setting X1≤Z1 and Z2≤Y2, voltage application time of the Z phase is included in the first time region, and width of the fourth time region is maximized. For example, Z1=X1 and Z2=X1+ΔZ. Definition of a PWM waveform of each phase in FIG. 33 is the same as the definition of a PWM waveform of each phase in FIG. 21, and will be omitted from description.

As illustrated in FIG. 33, in a case where the current direction of the Z-phase coil is the negative direction, and Conditional expressions (1) and (10) are satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the both-side-switching modulation method in one PWM cycle, so that width of the fourth time region in which voltage application time of the Z-phase coil and the first time region overlap is maximized.

As described above, in a case where the current direction of the Z-phase coil is the negative direction, and Conditional expressions (1) and (10) are satisfied, the control unit 13 can effectively suppress charge and discharge current of the smoothing capacitor 40 by performing the processing of Step S28.

Returning to FIG. 20 and continuing the description, in a case where Conditional expression (10) is not satisfied (Step S27: No), the control unit 13 proceeds to Step S29. When proceeding to Step S29, the control unit 13 determines whether or not Conditional expression (3) is satisfied (Step S29). Specifically, in Step S29, the control unit 13 determines whether or not Conditional expression (3) is satisfied by substituting the target voltage application time lengths ΔX and ΔZ required by motor control in current one PWM cycle into Conditional expression (3).

$$\Delta X \geq \Delta Z \tag{3}$$

In a case where Conditional expression (3) is satisfied (Step S29: Yes), the control unit 13 proceeds to next Step S30. On the other hand, in a case where Conditional expression (3) is not satisfied (Step S29: No), the control unit 13 proceeds to Step S31 in a flowchart of FIG. 20. Hereinafter, first, a case where the control unit 13 proceeds from Step S29 to Step S30 will be described, and a case where the control unit 13 proceeds from Step S29 to Step S31 will be described later.

As described above, in a case where the current direction of the Z-phase coil is the negative direction, and in a case where Conditional expressions (1) and (3) are satisfied and Conditional expression (10) is not satisfied, the control unit 13 executes the processing of Step S30. When proceeding to Step S30, the control unit 13 controls the Y-phase coil by a modulation method of an opposite type to that for the X-phase coil, and controls the Z-phase coil by the both-side-switching modulation method (Step S30).

Specifically, in Step S30, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S30, the control unit 13 maximizes width of the fourth time region by controlling the Z-phase coil by the both-side-switching modulation method in one PWM cycle.

Figure 34:
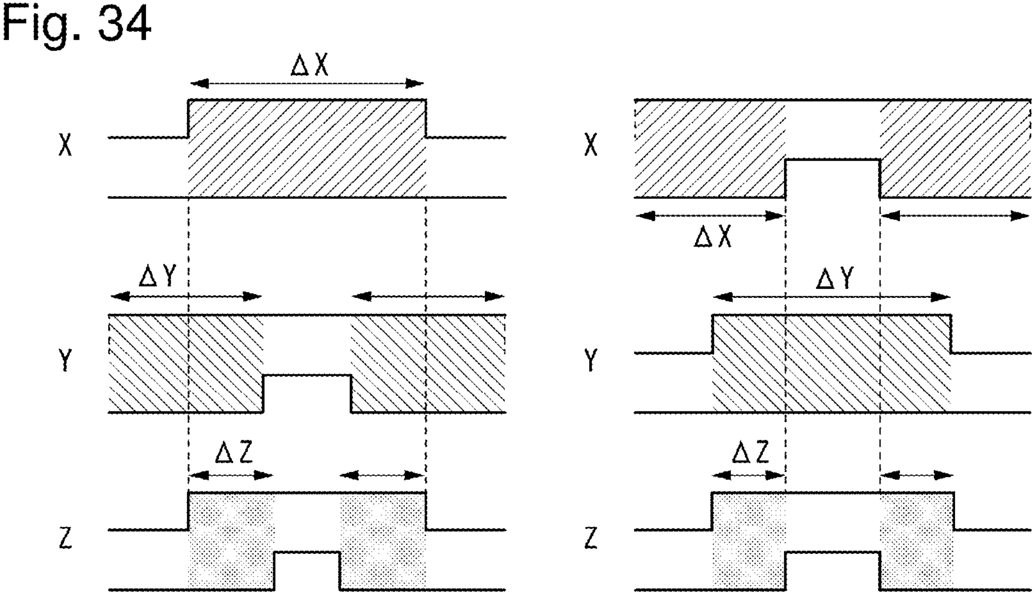
FIG. 34 illustrates an example of PWM waveforms of an X phase, a Y phase, and a Z phase generated by the control unit performing processing in Step S30 of the flowchart of FIG. 20.

FIG. 34 illustrates an example of PWM waveforms of an X phase, a Y phase, and a Z phase generated by the control unit 13 performing the processing in Step S30. Between two PWM waveforms illustrated in FIG. 34, a PWM waveform on the left side is an example of a PWM waveform in a case where the X-phase coil is controlled by the low-side-on-fixed modulation method, the Y-phase coil is controlled by the high-side-on-fixed modulation method, and the Z-phase coil is controlled by the both-side-switching modulation method. In this case (case where X1=0 and Y2=1), Z2=X2 and Z1=X2−ΔZ.

Between two PWM waveforms illustrated in FIG. 34, a PWM waveform on the right side is an example of a PWM waveform in a case where the X-phase coil is controlled by the high-side-on-fixed modulation method, the Y-phase coil is controlled by the low-side-on-fixed modulation method, and the Z-phase coil is controlled by the both-side-switching modulation method. In this case (case where X2=1 and Y1=0), Z1=X1 and Z2=X1+ΔZ. Definition of a PWM waveform of each phase in FIG. 34 is the same as the definition of a PWM waveform of each phase in FIG. 21, and will be omitted from description.

As illustrated in FIG. 34, in a case where the current direction of the Z-phase coil is the negative direction, Conditional expressions (1) and (3) are satisfied, and Conditional expression (10) is not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by the both-side-switching modulation method in one PWM cycle, so that width of the fourth time region in which voltage application time of the Z-phase coil and the first time region overlap is maximized.

As described above, in a case where the current direction of the Z-phase coil is the negative direction, Conditional expressions (1) and (3) are satisfied, and Conditional expression (10) is not satisfied, the control unit 13 can effectively suppress charge and discharge current of the smoothing capacitor 40 by performing the processing of Step S30.

Returning to FIG. 20 and continuing the description, in a case where Conditional expression (3) is not satisfied (Step S29: No), the control unit 13 proceeds to Step S31. As described above, in a case where the current direction of the Z-phase coil is the negative direction, and in a case where Conditional expression (1) is satisfied and Conditional expressions (3) and (10) are not satisfied, the control unit 13 executes the processing of Step S31.

When proceeding to Step S31, the control unit 13 controls the Y-phase coil by a modulation method of an opposite type to that for the X-phase coil, and controls the Z-phase coil by a modulation method of the same type as that for the X-phase coil (Step S30). Specifically, in Step S31, the control unit 13 minimizes the width of the first time region by controlling one of the X-phase coil and the Y-phase coil by the high-side-on-fixed modulation method and the other by the low-side-on-fixed modulation method in one PWM cycle. Further, in Step S31, the control unit 13 maximizes width of the third time region by controlling the Z-phase coil by the same modulation method as that for the X-phase coil in one PWM cycle.

Figure 35:
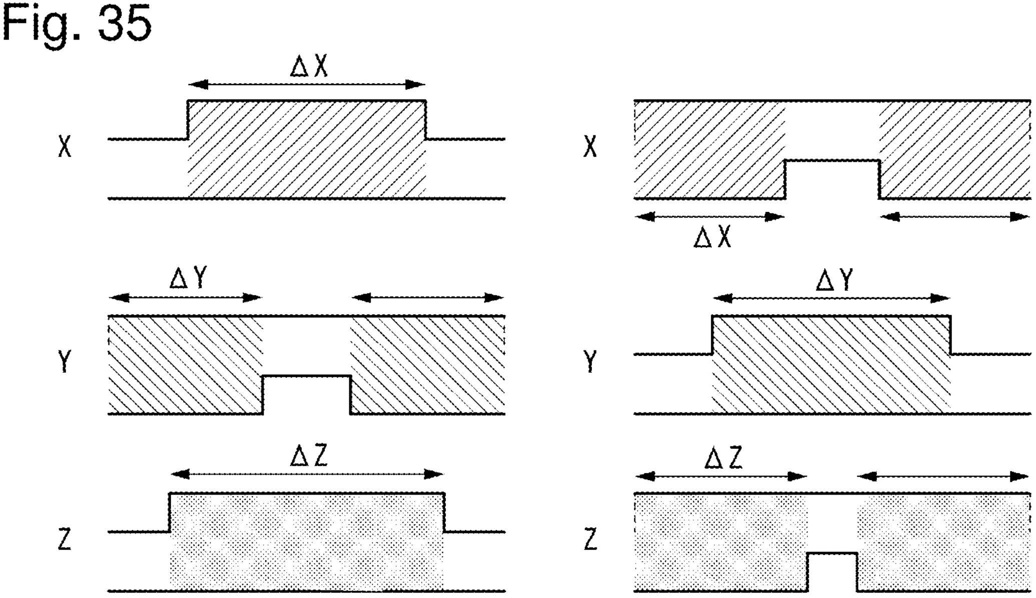
FIG. 35 illustrates an example of PWM waveforms of an X phase, a Y phase, and a Z phase generated by the control unit performing processing in Step S31 of the flowchart of FIG. 20.

FIG. 35 illustrates an example of PWM waveforms of an X phase, a Y phase, and a Z phase generated by the control unit 13 performing the processing in Step S31. Between two PWM waveforms illustrated in FIG. 35, a PWM waveform on the left side is an example of a PWM waveform in a case where the X-phase coil is controlled by the low-side-on-fixed modulation method, the Y-phase coil is controlled by the high-side-on-fixed modulation method, and the Z-phase coil is controlled by the low-side-on-fixed method. Between the two PWM waveforms illustrated in FIG. 35, a PWM waveform on the right side is an example of a PWM waveform in a case where the X-phase coil is controlled by the high-side-on-fixed modulation method, the Y-phase coil is controlled by the low-side-on-fixed modulation method, and the Z-phase coil is controlled by the high-side-on-fixed modulation method. Definition of a PWM waveform of each phase in FIG. 35 is the same as the definition of a PWM waveform of each phase in FIG. 21, and will be omitted from description.

As illustrated in FIG. 35, in a case where the current direction of the Z-phase coil is the negative direction, Conditional expression (1) is satisfied, and Conditional expressions (3) and (10) are not satisfied, one of the X-phase coil and the Y-phase coil is controlled by the high-side-on-fixed modulation method and the other is controlled by the low-side-on-fixed modulation method in one PWM cycle, so that width of the first time region in which voltage application time of the X-phase coil and voltage application time of the Y-phase coil overlap is minimized. Further, in this case, the Z-phase coil is controlled by a modulation method of the same type as that for the X-phase coil in one PWM cycle, so that width of the third time region in which voltage application time of the Z-phase coil and voltage application time of the X-phase coil overlap is maximized.

As described above, in a case where the current direction of the Z-phase coil is the negative direction, Conditional expression (1) is satisfied, and Conditional expressions (3) and (10) are not satisfied, the control unit 13 can effectively suppress charge and discharge current of the smoothing capacitor 40 by performing the processing of Step S31.

Returning to FIG. 20 and continuing the description, in a case where Conditional expression (1) is not satisfied (Step S26: No), the control unit 13 proceeds to Step S32. When proceeding to Step S32, the control unit 13 determines whether or not Conditional expression (3) is satisfied (Step S32). Specifically, in Step S32, the control unit 13 determines whether or not Conditional expression (3) is satisfied by substituting the target voltage application time lengths ΔX and ΔZ required by motor control in current one PWM cycle into Conditional expression (3).

$$\Delta X \geq \Delta Z \tag{3}$$

In a case where Conditional expression (3) is satisfied (Step S32: Yes), the control unit 13 proceeds to next Step S33. On the other hand, in a case where Conditional expression (3) is not satisfied (Step S32: No), the control unit 13 proceeds to Step S34 in a flowchart of FIG. 20. Hereinafter, first, a case where the control unit 13 proceeds from Step S32 to Step S33 will be described, and a case where the control unit 13 proceeds from Step S32 to Step S34 will be described later.

As described above, in a case where the current direction of the Z-phase coil is the negative direction, and in a case where Conditional expression (1) is not satisfied and Conditional expressions (3) is satisfied, the control unit 13 executes the processing of Step S33. When proceeding to Step S33, the control unit 13 controls the Y-phase coil by a modulation method of an opposite type to that for the X-phase coil or the both-side-switching modulation method, and controls the Z-phase coil by a modulation method of the same type as that for the X-phase coil or the both-side-switching modulation method (Step S33).

Specifically, in Step S33, the control unit 13 sets width of the first time region to zero by controlling the X-phase coil by any of one of the high-side-on-fixed modulation method and the low-side-on-fixed modulation method or the both-side-switching modulation method in one PWM cycle, and controlling the Y-phase coil by any of the other one of the high-side-on-fixed modulation method and the low-side-on-fixed modulation method or the both-side-switching modulation method. Further, in Step S33, the control unit 13 controls the Z-phase coil in any of one of the high-side-on-fixed modulation method and the low-side-on-fixed modulation method or the both-side-switching modulation method in one PWM cycle, so as to include voltage application time of the Z-phase coil in voltage application time of the X-phase coil.

Figure 36:
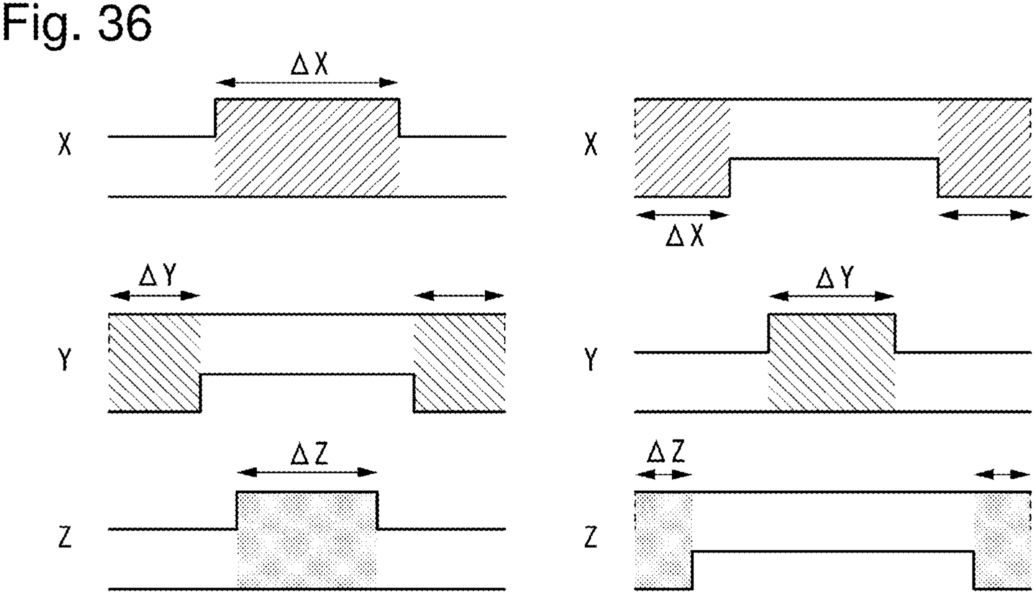
FIG. 36 illustrates an example of PWM waveforms of an X phase, a Y phase, and a Z phase generated by the control unit performing processing in Step S33 of the flowchart of FIG. 20.

FIG. 36 illustrates an example of PWM waveforms of an X phase, a Y phase, and a Z phase generated by the control unit 13 performing the processing in Step S33. Between two PWM waveforms illustrated in FIG. 36, a PWM waveform on the left side is an example of a PWM waveform in a case where the X-phase coil is controlled by the low-side-on-fixed modulation method, the Y-phase coil is controlled by the high-side-on-fixed modulation method, and the Z-phase coil is controlled by the low-side-on-fixed modulation method. In this case (case where X1=0), a condition of Y1≥X2≥Z2 only needs to be satisfied. Preferably, Z1=0.

Between the two PWM waveforms illustrated in FIG. 36, a PWM waveform on the right side is an example of a PWM waveform in a case where the X-phase coil is controlled by the high-side-on-fixed modulation method, the Y-phase coil is controlled by the low-side-on-fixed modulation method, and the Z-phase coil is controlled by the high-side-on-fixed modulation method. In this case (case where X2=1), a condition of Z1≥X1≥Y2 only needs to be satisfied. Preferably, Z2=1. Definition of a PWM waveform of each phase in FIG. 36 is the same as the definition of a PWM waveform of each phase in FIG. 21, and will be omitted from description.

As illustrated in FIG. 36, in a case where the current direction of the Z-phase coil is the negative direction, Conditional expression (1) is not satisfied, and Conditional expression (3) is satisfied, the Y-phase coil is controlled by a modulation method of an opposite type to that for the X-phase coil in one PWM cycle, so that width of the first time region in which voltage application time of the X-phase coil and voltage application time of the Y-phase coil overlap becomes zero. Further, in this case, the Z-phase coil is controlled by a modulation method of the same type as that for the X-phase coil in one PWM cycle, so that voltage application time of the Z-phase coil is included in voltage application time of the X-phase coil.

As described above, in a case where the current direction of the Z-phase coil is the negative direction, Conditional expression (1) is not satisfied, and Conditional expression (3) is satisfied, the control unit 13 can effectively suppress charge and discharge current of the smoothing capacitor 40 by performing the processing of Step S33. In this case, at least one of the X-phase coil and the Y-phase coil may be controlled by the both-side-switching modulation method as long as voltage application time of the Y-phase coil does not overlap voltage application time of the X-phase coil.

Further, if voltage application time of the Z-phase coil is included in voltage application time of the X-phase coil, the Z-phase coil may be controlled by the both-side-switching modulation method. Note that controlling the Z-phase coil by the same high-side-on-fixed modulation method or low-side-on-fixed modulation method as the X-phase coil is advantageous in that a switching loss can be reduced.

Returning to FIG. 20 and continuing the description, in a case where Conditional expression (3) is not satisfied (Step S32: No), the control unit 13 proceeds to Step S34. As described above, in a case where the current direction of the Z-phase coil is the negative direction, and in a case where Conditional expressions (1) and (3) are not satisfied, the control unit 13 executes the processing of Step S34.

When proceeding to Step S34, the control unit 13 controls the Y-phase coil by the both-side-switching modulation method, and controls the Z-phase coil by a modulation method of the same type as that for the X-phase coil (Step S34). Specifically, in Step S34, the control unit 13 minimizes the width of the first time region by controlling the X-phase coil by the high-side-on-fixed modulation method or the low-side-on-fixed modulation method and controlling the Y-phase coil by the both-side-switching modulation method in one PWM cycle. Further, in Step S34, the control unit 13 maximizes width of the third time region by controlling the Z-phase coil by the same modulation method as that for the X-phase coil in one PWM cycle. Furthermore, the control unit 13 makes voltage application time of the X-phase coil and voltage application time of the Y-phase coil adjacent to each other in one PWM cycle, so as to maximize width of the fifth time region in which voltage application time of the Z-phase coil and voltage application time of the Y-phase coil overlap under a condition that voltage application time of the Z-phase coil includes voltage application time of the X-phase coil.

Figure 37:
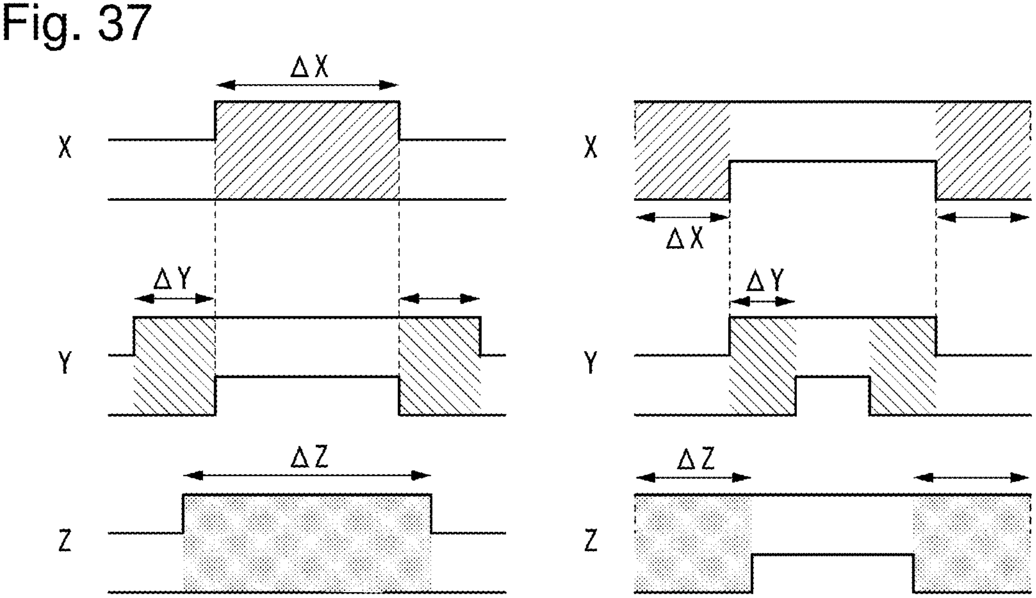
FIG. 37 illustrates an example of PWM waveforms of an X phase, a Y phase, and a Z phase generated by the control unit performing processing in Step S34 of the flowchart of FIG. 20.

FIG. 37 illustrates an example of PWM waveforms of an X phase, a Y phase, and a Z phase generated by the control unit 13 performing the processing in Step S34. Between two PWM waveforms illustrated in FIG. 37, a PWM waveform on the left side is an example of a PWM waveform in a case where the X-phase coil is controlled by the low-side-on-fixed modulation method, the Y-phase coil is controlled by the both-side-switching modulation method, and the Z-phase coil is controlled by the low-side-on-fixed modulation method. In this case (case where X1=0), Y1=X2, Y2=X2+ΔY, Z1=0, and Z2=ΔZ.

Between the two PWM waveforms illustrated in FIG. 37, a PWM waveform on the right side is an example of a PWM waveform in a case where the X-phase coil is controlled by the high-side-on-fixed modulation method, the Y-phase coil is controlled by the both-side-switching modulation method, and the Z-phase coil is controlled by the high-side-on-fixed modulation method. In this case (case where X2=1), Y2=X1, Y1=X1−ΔY, Z2=1, and Z1=1−ΔZ. Definition of a PWM waveform of each phase in FIG. 37 is the same as the definition of a PWM waveform of each phase in FIG. 21, and will be omitted from description.

As illustrated in FIG. 37, in a case where a current direction of the Z-phase coil is the negative direction, and Conditional expressions (1) and (3) are not satisfied, the X-phase coil is controlled by the high-side-on-fixed modulation method or the low-side-on-fixed modulation method in one PWM cycle, and the Y-phase coil is controlled by the both-side-switching modulation method, so that width of the first time region in which voltage application time of the X-phase coil and voltage application time of the Y-phase coil overlap is minimized. Further, in this case, the Z-phase coil is controlled by the same modulation method as the X-phase coil in one PWM cycle, so that width of the third time region in which voltage application time of the Z-phase coil and voltage application time of the X-phase coil overlap is maximized. Furthermore, in this case, voltage application time of the X-phase coil and voltage application time of the Y-phase coil are made adjacent to each other in one PWM cycle, so that width of the fifth time region in which voltage application time of the Z-phase coil and voltage application time of the Y-phase coil overlap is maximized under a condition that voltage application time of the Z-phase coil includes voltage application time of the X-phase coil.

As described above, in a case where the current direction of the Z-phase coil is the negative direction, and Conditional expressions (1) and (3) are not satisfied, the control unit 13 can effectively suppress charge and discharge current of the smoothing capacitor 40 by performing the processing of Step S33.

As described above, the control unit 13 included in the power conversion device 10 of the present embodiment minimizes the width of the first time region in which voltage application time of the X-phase coil with a largest current value among three-phase coils of the motor 20 and voltage application time of the Y-phase coil with a second largest current value among the three-phase coils overlap within one PWM cycle, and changes a position of the second time region occupied by voltage application time of the Z-phase coil within one PWM cycle, based on target voltage application time length of each of the X-phase coil, the Y-phase coil, and the Z-phase coil and on the current direction of the Z-phase coil, the Z-phase coil having a smallest current value among the three-phase coils. According to the present embodiment, also in a case where there is a period in which a voltage direction and a current direction are opposite in one electrical angle cycle due to a delay of a current phase with respect to a voltage phase, it is possible to reduce a time zone in which current flows simultaneously in three phases and in the same direction as much as possible. As a result, as compared with the conventional technique, charge and discharge current of the smoothing capacitor 40 can be effectively suppressed, and heat generation of the smoothing capacitor 40 can be further suppressed.

The present invention is not limited to the above embodiment, and the configurations described in the present description can be appropriately combined within a range not conflicting with one another.

For example, in the above embodiment, an aspect in which the control unit 13 executes the center alignment PWM in which duty is updated once every one PWM cycle (one cycle of a triangular wave) by using a carrier waveform which is a triangular wave, but the present invention is not limited to this. For example, the control unit according to the present invention may execute asymmetric center alignment PWM in which duty is updated every half PWM cycle (half cycle of a triangular wave) by using a carrier waveform that is a triangular wave.

Figure 38:
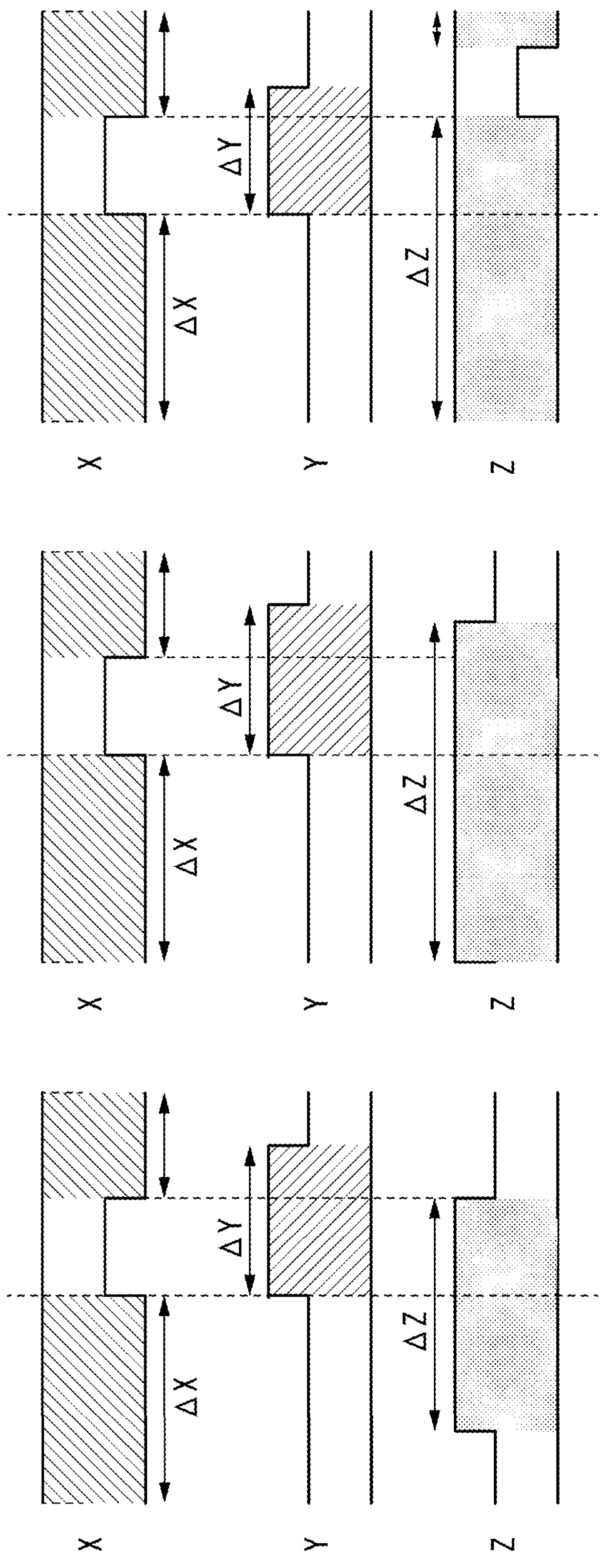
FIG. 38 is an explanatory diagram relating to a variation of the present invention.

In a case of using the asymmetric center alignment PWM, the control unit may control the X-phase coil by the high-side-on-fixed modulation method or the low-side-on-fixed modulation method, and control the Y-phase coil and the Z-phase coil by a modulation method of an opposite type to that for the X-phase coil. A left diagram and a center diagram in FIG. 38 illustrate an example of PWM waveforms of an X phase, a Y phase, and a Z phase generated by the control unit performing the asymmetric center alignment PWM. In the examples of these diagrams, the control unit controls the X-phase coil by the high-side-on-fixed modulation method, and controls the Y-phase coil and the Z-phase coil by the low-side-on-fixed modulation method.

In the example of the PWM waveform illustrated in the left diagram, the control unit matches a turn-on edge of an X-phase low-duty switch with a turn-on edge of a Y-phase high-duty switch, and matches a turn-off edge of the X-phase low-duty switch with a turn-off edge of a Z-phase high-duty switch. Alternatively, conversely, a turn-off edge of the X-phase low-duty switch and a turn-off edge of the Y-phase high-duty switch may be matched, and a turn-on edge of the X-phase low-duty switch and a turn-on edge of the Z-phase high-duty switch may be matched. In a case of using the asymmetric center alignment PWM, as the control unit generates such a PWM waveform, it is possible to reduce a time zone in which current simultaneously flows through three phases as much as possible, and thus, it is possible to effectively suppress charge and discharge current of the smoothing capacitor.

However, when the asymmetric center alignment PWM is used, a turn-off edge of a Y-phase high-duty switch or a turn-on edge of a Z-phase high-duty switch may deviate from one PWM cycle (one cycle of a triangular wave). In this case, as illustrated in the center diagram of FIG. 38, a turn-off edge of the Y-phase high-duty switch or a turn-on edge of the Z-phase high-duty switch may be matched with an end of one PWM cycle, and a turn-on edge of the Y-phase high-duty switch or a turn-off edge of the Z-phase high-duty switch may be matched with a turn-on edge or a turn-off edge of an X-phase low-duty switch. Alternatively, conversely, a turn-on edge of the Y-phase high-duty switch or a turn-off edge of the Z-phase high-duty switch may be matched with an end of one PWM cycle, and a turn-off edge of the Y-phase high-duty switch or a turn-on edge of the Z-phase high-duty switch may be matched with a turn-off edge or a turn-on edge of the X-phase low-duty switch.

Note that, in a case of using the asymmetric center alignment PWM, the control unit may control the X-phase coil by the low-side-on-fixed modulation method and control the Y-phase coil and the Z-phase coil by the high-side-on-fixed modulation method. In this case, the control unit matches a turn-on edge of an X-phase high-duty switch with a turn-on edge of a Y-phase low-duty switch, and matches a turn-off edge of the X-phase high-duty switch with a turn-off edge of a Z-phase low-duty switch. Alternatively, conversely, a turn-off edge of the X-phase high-duty switch and a turn-off edge of the Y-phase low-duty switch may be matched, and a turn-on edge of the X-phase high-duty switch and a turn-on edge of the Z-phase low-duty switch may be matched.

Further, the control unit according to the present invention may execute edge alignment PWM in which duty is updated once every one PWM cycle (one cycle of a sawtooth wave) by using a carrier waveform that is a sawtooth wave.

In a case of using the edge alignment PWM, the control unit can appropriately select the high-side-on-fixed modulation method or the low-side-fixed modulation method for each of an X phase, a Y phase, and a Z phase. For example, the control unit may control the X-phase coil by the high-side-on-fixed modulation method or the low-side-on-fixed modulation method, control the Y-phase coil by a modulation method of an opposite type to that for the X-phase coil, and control the Z-phase coil by the same modulation method as the X-phase coil. A right diagram in FIG. 38 illustrates an example of PWM waveforms of an X phase, a Y phase, and a Z phase generated by the control unit performing the edge alignment PWM. In the examples of the right diagram, the control unit controls the X-phase coil and the Z-phase coil by the high-side-on-fixed modulation method, and controls the Y-phase coil by the low-side-on-fixed modulation method.

In the example of the PWM waveform illustrated in the right diagram, the control unit matches a turn-on edge of an X-phase low-duty switch with a turn-on edge of a Y-phase high-duty switch, and matches a turn-off edge of the X-phase low-duty switch with a turn-on edge of a Z-phase low-duty switch.

Note that, in a case of using the edge alignment PWM, the control unit may control the X-phase coil and the Z-phase coil by the low-side-on-fixed modulation method and control the Y-phase coil by the high-side-on-fixed modulation method. In this case, the control unit matches a turn-on edge of an X-phase high-duty switch with a turn-on edge of a Y-phase low-duty switch, and matches a turn-off edge of the X-phase high-duty switch with a turn-on edge of a Z-phase high-duty switch.

Further, in the above embodiment, a MOS-FET is exemplified as each switch included in the first three-phase full-bridge circuit 11 and the second three-phase full-bridge circuit 12, but each switch may be, for example, a high-power switching element other than a MOS-FET such as an Insulated Gate Bipolar Transistor (IGBT).

In the above embodiment, a shunt resistor of each phase is provided between a source terminal of a low-side switch and a negative electrode terminal of the DC power supply 30 to perform current detection, but the shunt resistor may be provided in another portion (for example, a connection terminal portion of each phase) as long as phase current detection is possible. Further, a current detection means is not limited to a method using a shunt resistor, and for example, a non-contact type current sensor can also be used.

Further, in the above embodiment, influence of the dead time Td is ignored in the description. However, in a case where the dead time Td is provided between a high-side gate signal and a low-side gate signal, charge and discharge current of the smoothing capacitor 40 can be more effectively suppressed in consideration of a shift portion of a turn-on edge or a turn-off edge due to the dead time Td. In a case where switching is performed on an inverter located on a downstream side of phase current between the first inverter 11 and the second inverter 12, voltage application time of the phase is defined by a turn-on edge and a turn-off edge on the low side. For this reason, an edge of voltage application time is shifted from a turn-off edge and a turn-on edge on the high side by the dead time Td. For this reason, as described above, it is preferable to subtract 2Td from the left side of Expressions (11) to (13). Further, duty of an inverter on the current downstream side is regarded as a value obtained by adding 2Td to high-side duty except for a case where a duty value is zero and one, so that charge and discharge current of the smoothing capacitor 40 can be suppressed more precisely.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device, comprising:

a first three-phase full-bridge circuit connected to one end of a three-phase coil of an open-winding three-phase motor;

a second three-phase full-bridge circuit connected to another end of the three-phase coil; and a control unit that individually controls voltage application time of the three-phase coil by controlling the first three-phase full-bridge circuit and the second three-phase full-bridge circuit by pulse width modulation, wherein the control unit minimizes a width of a first time region in which voltage application time of an X-phase coil with a largest current value among the three-phase coils and voltage application time of a Y-phase coil with a second largest current value among the three-phase coils overlap within one control period of the pulse width modulation, and changes a position of a second time region occupied by voltage application time of a Z-phase coil within the one control period, based on a target voltage application time length of each of the X-phase coil, the Y-phase coil, and the Z-phase coil and on a current direction of the Z-phase coil, the Z-phase coil having a smallest current value among the three-phase coils.

2. The power conversion device according to claim 1, wherein in a case where the current direction of the Z-phase coil is a positive direction, the control unit minimizes a width of a third time region in which voltage application time of the Z-phase coil and voltage application time of the X-phase coil overlap or minimizes a width of a fourth time region in which voltage application time of the Z-phase coil and the first time region overlap, by determining a modulation method of the three-phase coil and a position of the second time region based on success or failure of at least one of Conditional expressions (1) to (9), in the Conditional expressions (1) to (9), ΔX is a target voltage application time length of the X-phase coil, ΔY is a target voltage application time length of the Y-phase coil, ΔZ is a target voltage application time length of the Z-phase coil, Ix is a current value of the X-phase coil, and Iy is a current value of the Y-phase coil, the modulation method includes a high-side-on-fixed modulation method, a low-side-on-fixed modulation method, and a both-side-switching modulation method, the high-side-on-fixed modulation method is to fix an i-phase high-side switch (i is any of X, Y, and Z) of one of the first three-phase full-bridge circuit and the second three-phase full-bridge circuit to be turned on, and control an i-phase low-side switch of another one by the pulse width modulation, the low-side-on-fixed modulation method is to fix the i-phase low-side switch of one of the first three-phase full-bridge circuit and the second three-phase full-bridge circuit to be turned on and control the i-phase high-side switch of another one by the pulse width modulation, and the both-side-switching modulation method is to control both the i-phase high-side switch of one of the first three-phase full-bridge circuit and the second three-phase full-bridge circuit and the i-phase low-side switch of another one by the pulse width modulation:

$$\Delta X + \Delta Y \geq 1 \tag{1}$$

$$\Delta X + \Delta Z \geq 1 \tag{2}$$

$$\Delta X \geq \Delta Z \tag{3}$$

$$\Delta Y + \Delta Z \geq 1 \tag{4}$$

$$\Delta Y \geq \Delta Z \tag{5}$$

$$(1 - \Delta X) \cdot Ix - (1 - \Delta Y) \cdot Iy \geq 0 \tag{6}$$

$$(1 - \Delta X) \cdot Ix - (1 - \Delta Z) \cdot Iy \geq 0 \tag{7}$$

$$(1 - \Delta X) \cdot Ix - \Delta Z \cdot Iy \geq 0 \tag{8}$$

$$(1 - \Delta X) \cdot Ix - \Delta Y \cdot Iy \geq 0. \tag{9}$$

3. The power conversion device according to claim 2, wherein the control unit minimizes the width of the first time region and the width of the third time region within the one control period in a case where any one of the Conditional expressions (1), (2), and (3) is not satisfied.

4. The power conversion device according to claim 2, wherein in a case where the Conditional expressions (1) and (2) are not satisfied, the control unit sets the width of the first time region and the width of the third time region to zero and minimizes a width of a fifth time region in which voltage application time of the Z-phase coil and voltage application time of the Y-phase coil overlap within the one control period.

5. The power conversion device according to claim 2, wherein the control unit, in a case where the Conditional expressions (1) to (6) are satisfied, minimizes the width of the first time region by controlling one of the X-phase coil and the Y-phase coil by the high-side-on-fixed modulation method and another one by the low-side-on-fixed modulation method in the one control period, minimizes the width of the third time region by controlling the Z-phase coil by a same modulation method as the Y-phase coil in the one control period, minimizes the width of the first time region by controlling one of the X-phase coil and the Y-phase coil by the high-side-on-fixed modulation method and another one by the low-side-on-fixed modulation method in the one control period in a case where the Conditional expressions (1) to (5) are satisfied and the Conditional expression (6) is not satisfied, and minimizes the width of the fourth time region by controlling the Z-phase coil in a same modulation method as the X-phase coil in the one control period.

6. The power conversion device according to claim 2, wherein the control unit, in a case where the Conditional expressions (1) to (4) and (7) are satisfied and the Conditional expression (5) is not satisfied, minimizes the width of the first time region by controlling one of the X-phase coil and the Y-phase coil by the high-side-on-fixed modulation method and another one by the low-side-on-fixed modulation method in the one control period, and minimizes the width of the third time region by controlling the Z-phase coil by a same modulation method as the Y-phase coil in the one control period, and in a case where the Conditional expressions (1) to (4) are satisfied and the Conditional expressions (5) and (7) are not satisfied, minimizes the width of the first time region by controlling one of the X-phase coil and the Y-phase coil by the high-side-on-fixed modulation method and another one by the low-side-on-fixed modulation method in the one control period, and minimizes the width of the fourth time region by controlling the Z-phase coil by a same modulation method as the X-phase coil in the one control period.

7. The power conversion device according to claim 2, wherein the control unit, in a case where the Conditional expressions (1) to (3), (5), and (8) are satisfied and the Conditional expression (4) is not satisfied, minimizes the width of the first time region by controlling one of the X-phase coil and the Y-phase coil by the high-side-on-fixed modulation method and another one by the low-side-on-fixed modulation method in the one control period, and minimizes the width of the third time region by controlling the Z-phase coil by a same modulation method as the Y-phase coil in the one control period, and in a case where the Conditional expressions (1) to (3) and (5) are satisfied and the Conditional expressions (4) and (8) are not satisfied, minimizes the width of the first time region by controlling one of the X-phase coil and the Y-phase coil by the high-side-on-fixed modulation method and another one by the low-side-on-fixed modulation method in the one control period, and minimizes the width of the fourth time region by controlling the Z-phase coil by a same modulation method as the X-phase coil or controlling the Z-phase coil by the both-side-switching modulation method in the one control period.

8. The power conversion device according to claim 2, wherein the control unit, in a case where the Conditional expressions (1) to (3) and (9) are satisfied and the Conditional expressions (4) and (5) are not satisfied, minimizes the width of the first time region by controlling one of the X-phase coil and the Y-phase coil by the high-side-on-fixed modulation method and another one by the low-side-on-fixed modulation method in the one control period, and minimizes the width of the third time region by controlling the Z-phase coil by a same modulation method as the Y-phase coil in the one control period, and in a case where the Conditional expressions (1) to (3) are satisfied and the Conditional expressions (4), (5), and (9) are not satisfied, minimizes the width of the first time region by controlling one of the X-phase coil and the Y-phase coil by the high-side-on-fixed modulation method and another one by the low-side-on-fixed modulation method in the one control period, and minimizes the width of the fourth time region by controlling the Z-phase coil by a same modulation method as the X-phase coil or controlling the Z-phase coil by the both-side-switching modulation method in the one control period.

9. The power conversion device according to claim 1, wherein in a case where the current direction of the Z-phase coil is a negative direction, the control unit maximizes width of a third time region in which voltage application time of the Z-phase coil and voltage application time of the X-phase coil overlap and also maximizes width of a fourth time region in which voltage application time of the Z-phase coil and the first time region overlap, by determining a modulation method of the three-phase coil and a position of the second time region based on success or failure of at least one of Conditional expressions (1), (3), and (10), in the Conditional expressions (1), (3), and (10), ΔX is a target voltage application time length of the X-phase coil, ΔY is a target voltage application time length of the Y-phase coil, and ΔZ is a target voltage application time length of the Z-phase coil, the modulation method includes a high-side-on-fixed modulation method, a low-side-on-fixed modulation method, and a both-side-switching modulation method, the high-side-on-fixed modulation method is to fix an i-phase high-side switch (i is any of X, Y, and Z) of one of the first three-phase full-bridge circuit and the second three-phase full-bridge circuit to be turned on, and control an i-phase low-side switch of another one by the pulse width modulation, the low-side-on-fixed modulation method is to fix the i-phase low-side switch of one of the first three-phase full-bridge circuit and the second three-phase full-bridge circuit to be turned on and control the i-phase high-side switch of another one by the pulse width modulation, and the both-side-switching modulation method is to control both the i-phase high-side switch of one of the first three-phase full-bridge circuit and the second three-phase full-bridge circuit and the i-phase low-side switch of another one by the pulse width modulation:

$$\Delta X + \Delta Y \geq 1 \tag{1}$$

$$\Delta X \geq \Delta Z \tag{3}$$

$$\Delta X + \Delta Y \geq \Delta Z + 1. \tag{10}$$

10. The power conversion device according to claim 9, wherein the control unit, in a case where the Conditional expressions (1) and (10) are satisfied, minimizes the width of the first time region by controlling one of the X-phase coil and the Y-phase coil by the high-side-on-fixed modulation method and another one by the low-side-on-fixed modulation method in the one control period, and maximizes the width of the fourth time region by controlling the Z-phase coil by the both-side-switching modulation method in the one control period.

11. The power conversion device according to claim 9, wherein the control unit, in a case where the Conditional expressions (1) and (3) are satisfied and the Conditional expression (10) is not satisfied, minimizes the width of the first time region by controlling one of the X-phase coil and the Y-phase coil by the high-side-on-fixed modulation method and another one by the low-side-on-fixed modulation method in the one control period, and maximizes the width of the fourth time region by controlling the Z-phase coil by the both-side-switching modulation method in the one control period.

12. The power conversion device according to claim 9, wherein the control unit, in a case where the Conditional expression (1) is satisfied and the Conditional expressions (3) and (10) are not satisfied, minimizes the width of the first time region by controlling one of the X-phase coil and the Y-phase coil by the high-side-on-fixed modulation method and another one by the low-side-on-fixed modulation method in the one control period, and maximizes the width of the third time region by controlling the Z-phase coil by a same modulation method as the X-phase coil in the one control period.

13. The power conversion device according to claim 9, wherein the control unit, in a case where the Conditional expression (1) is not satisfied and the Conditional expression (3) is satisfied, in the one control period, controls the X-phase coil by any of one of the high-side-on-fixed modulation method and the low-side-on-fixed modulation method or the both-side-switching modulation method, controls the Y-phase coil by any of another one of the high-side-on-fixed modulation method and the low-side-on-fixed modulation method or the both-side-switching modulation method so as to set width of the first time region to zero, and includes voltage application time of the Z-phase coil in voltage application time of the X-phase coil by controlling the Z-phase coil by any of one of the high-side-on-fixed modulation method and the low-side-on-fixed modulation method or the both-side-switching modulation method.

14. The power conversion device according to claim 9, wherein the control unit, in a case where the Conditional expressions (1) and (3) are not satisfied, minimizes the width of the first time region by controlling the X-phase coil by the high-side-on-fixed modulation method or the low-side-on-fixed modulation method and controlling the Y-phase coil by the both-side-switching modulation method in the one control period, and maximizes the width of the third time region by controlling the Z-phase coil in a same modulation method as the X-phase coil in the one control period.

15. The power conversion device according to claim 14, wherein the control unit maximizes width of a fifth time region in which voltage application time of the Z-phase coil and voltage application time of the Y-phase coil overlap under a condition that voltage application time of the Z-phase coil includes voltage application time of the X-phase coil by making voltage application time of the X-phase coil and voltage application time of the Y-phase coil adjacent to each other in the one control period.

* * * * *